United States Patent
Baek et al.

(10) Patent No.: US 12,190,471 B2
(45) Date of Patent: Jan. 7, 2025

(54) IMAGE PROCESSING APPARATUS AND OPERATING METHOD THEREOF

(71) Applicant: SAMSUNG ELECTRONICS CO., LTD., Suwon-si (KR)

(72) Inventors: Sangwook Baek, Suwon-si (KR); Sangwon Lee, Suwon-si (KR); Taekeun Kang, Suwon-si (KR); Dongkyu Kim, Suwon-si (KR); Gihyeon Bae, Suwon-si (KR); Jungmin Lee, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 459 days.

(21) Appl. No.: 17/723,055

(22) Filed: Apr. 18, 2022

(65) Prior Publication Data

US 2023/0031143 A1 Feb. 2, 2023

Related U.S. Application Data

(63) Continuation of application No. PCT/KR2022/004156, filed on Mar. 24, 2022.

(30) Foreign Application Priority Data

Jul. 30, 2021 (KR) .................. 10-2021-0101025
Dec. 10, 2021 (KR) .................. 10-2021-0176998

(51) Int. Cl.
*G06T 3/4046* (2024.01)
*G06T 3/4007* (2024.01)
*G06T 7/00* (2017.01)

(52) U.S. Cl.
CPC .......... *G06T 3/4046* (2013.01); *G06T 3/4007* (2013.01); *G06T 7/0002* (2013.01)

(58) Field of Classification Search
CPC ... G06T 3/4046; G06T 3/4007; G06T 7/0002; G06T 5/00; G06T 5/50; G06T 5/60;
(Continued)

(56) References Cited

U.S. PATENT DOCUMENTS 9,799,098 B2 10/2017 Seung et al.
10,325,352 B1 6/2019 Kim et al.
(Continued)

FOREIGN PATENT DOCUMENTS

CN 107749052 A 3/2018
CN 109146061 A 1/2019
(Continued)

OTHER PUBLICATIONS

Chunbao Li and Bo Yang et al., "Adaptive Weighted CNN Features Integration for Correlation Filter Tracking", IEEE Access, vol. 7, Digital Object Identifier 10.1109/ACCESS.2019.2922494, Jun. 2019, 14 pages total.

(Continued)

*Primary Examiner* — Chan S Park
*Assistant Examiner* — D J Dhooge
(74) *Attorney, Agent, or Firm* — Sughrue Mion, PLLC

(57) ABSTRACT

An image processing apparatus for performing image quality processing on an image includes: a memory configured to store one or more instructions; and a processor configured to execute the one or more instructions stored in the memory to: obtain a first image by downscaling an input image by using a downscale network; extract first feature information corresponding to the first image by using a feature extraction network; obtain a second image by performing image quality processing on the first image based on the first feature (Continued)

information, by using an image quality processing network; and obtain an output image by upscaling the second image, extracting second feature information corresponding to the input image, and performing image quality processing on the upscaled second image based on the second feature information, by using an upscale network.

15 Claims, 19 Drawing Sheets

(58) Field of Classification Search
CPC ... G06T 7/11; G06T 5/70; G06T 2207/20016; G06T 2207/20081; G06T 2207/20084; G06N 3/08
See application file for complete search history.

(56) References Cited

U.S. PATENT DOCUMENTS

| | | | |
|---|---|---|---|
| 10,540,768 | B2 | 1/2020 | Yoo et al. |
| 10,630,996 | B2 | 4/2020 | Wang et al. |
| 10,636,177 | B2* | 4/2020 | Balestrieri ............... G06T 3/40 |
| 10,817,986 | B2 | 10/2020 | Park et al. |
| 11,164,340 | B2 | 11/2021 | Lee et al. |
| 11,189,013 | B2 | 11/2021 | Navarrete Michelini et al. |
| 11,551,332 | B2 | 1/2023 | Kim et al. |
| 2017/0024852 | A1* | 1/2017 | Oztireli ................... G06T 5/50 |
| 2018/0075581 | A1 | 3/2018 | Shi et al. |
| 2018/0365794 | A1 | 12/2018 | Lee et al. |
| 2019/0294931 | A1* | 9/2019 | Risser .................. G06T 3/4046 |
| 2020/0118249 | A1 | 4/2020 | Kim |
| 2020/0184627 | A1 | 6/2020 | Otroshi Shahreza et al. |
| 2021/0097691 | A1* | 4/2021 | Liu ...................... G06V 10/764 |
| 2021/0118095 | A1 | 4/2021 | Kim et al. |
| 2021/0150287 | A1 | 5/2021 | Baek et al. |
| 2021/0374552 | A1* | 12/2021 | Mallya .................... G06T 11/60 |
| 2021/0390660 | A1 | 12/2021 | Baek et al. |
| 2021/0400231 | A1 | 12/2021 | Park et al. |

FOREIGN PATENT DOCUMENTS

| | | |
|---|---|---|
| CN | 111191674 A | 5/2020 |
| CN | 111242846 A | 6/2020 |
| CN | 111340744 A | 6/2020 |
| JP | 2020-64557 A | 4/2020 |
| KR | 10-2020-0045740 A | 5/2020 |
| KR | 10-2021-0045828 A | 4/2021 |
| KR | 10-2021-0050186 A | 5/2021 |
| KR | 10-2269034 B1 | 6/2021 |

OTHER PUBLICATIONS

Xingjian Li et al., "Delta: Deep Learning Transfer Using Feature Map With Attention for Convolutional Networks", ICLR 2019, arXiv: 1901.09229v1, Jan. 2019, 15 pages total.

International Search Report and Written Opinion dated Jul. 29, 2021 issued by the International Searching Authority in International Application No. PCT/KR2021/005020 (PCT/ISA/220, PCT/ISA/210, and PCT/ISA/237).

Lingbo Yang et al., "HiFaceGAN: Face Renovation via Collaborative Suppression and Replenishment", arXiv:2005.05005v1, May 2020, 10 pages total.

Jongchan Park et al., "Distort-and-Recover: Color Enhancement using Deep Reinforcement Learning", arXiv:1804.04450v2, Apr. 2018, 9 pages total.

Taesung Park et al., "Semantic Image Synthesis with Spatially-Adaptive Normalization", arXiv:1903.07291v2, Nov. 2019, 19 pages total.

Navneet Dalal et al., "Histograms of Oriented Gradients for Human Detection", Jun. 2005, 8 pages total.

Hamid R. Sheikh et al., "Image Information and Visual Quality", Feb. 2006, 4 pages total.

Xintao Wang et al., "Recovering Realistic Texture in Image Super-resolution by Deep Spatial Feature Transform", Computer Vision Foundation, Apr. 2018, 10 pages total.

Bee Lim et al., "Enhanced Deep Residual Networks for Single Image Super-Resolution", Computer Vision Foundation, Jul. 2017, 9 pages total.

Xintao Wang et al., "Deep Network Interpolation for Continuous Imagery Effect Transition", Computer Vision Foundation, Nov. 2018, 10 pages total.

Jingwen He et al., "Modulating Image Restoration with Continual Levels via Adaptive Feature Modification Layers", arXiv:1904.08118v3, Jun. 2019, 9 pages total.

Xintao Wang et al., "ESRGAN: Enhanced Super-Resolution Generative Adversarial Networks", arXiv:1809.00219v2, Sep. 2018, 23 pages total.

Yanting Hu et al., "Channel-wise and Spatial Feature Modulation Network for Single Image Super-Resolution", IEEE Transactions on Circuits and Systems for Video Technology, Sep. 28, 2018, arXiv:1809.11130v1, pp. 1-14.

Jingwen He et al., "Multi-Dimension Modulation for Image Restoration with Dynamic Controllable Residual Learning", Dec. 11, 2019, arXiv:1912.05293v1, 9 Pages.

Notice of Allowance issued Feb. 21, 2023 by the United States Patent and Trademark Office in U.S. Appl. No. 17/240,360.

Communication issued May 29, 2024 by the European Patent Office in European Patent Application No. 22849658.4.

Wang, Longguang et al., "Learning for Video Super-Resolution Through HR Optical Flow Estimation", 14th Asian Conference on Computer Vision, Dec. 2-6, 2018, pp. 514-529. (16 pages total).

Buhler, Marcel C. et al., "DeepSEE: Deep Disentangled Semantic Explorative Extreme Super-Resolution", arXiv:2004.04433v2 [cs.CV], Oct. 1, 2020. (19 pages total).

Park, Taesung et al., "Semantic Image Synthesis with Spatially-Adaptive Normalization", CVPR 2019, Jan. 1, 2019, pp. 2337-2346. (10 pages total).

Baek, Sangwook et al., "Lightweight Image Enhancement Network for Mobile Devices Using Self-Feature Extraction and Dense Modulation", arxiv.org, May 2, 2022. (8 pages total).

International Search Report and Written Opinion dated Jun. 24, 2022 issued by the International Searching Authority in International Application No. PCT/KR2022/004156 (PCT/ISA/220, PCT/ISA/210, and PCT/ISA/237).

\* cited by examiner

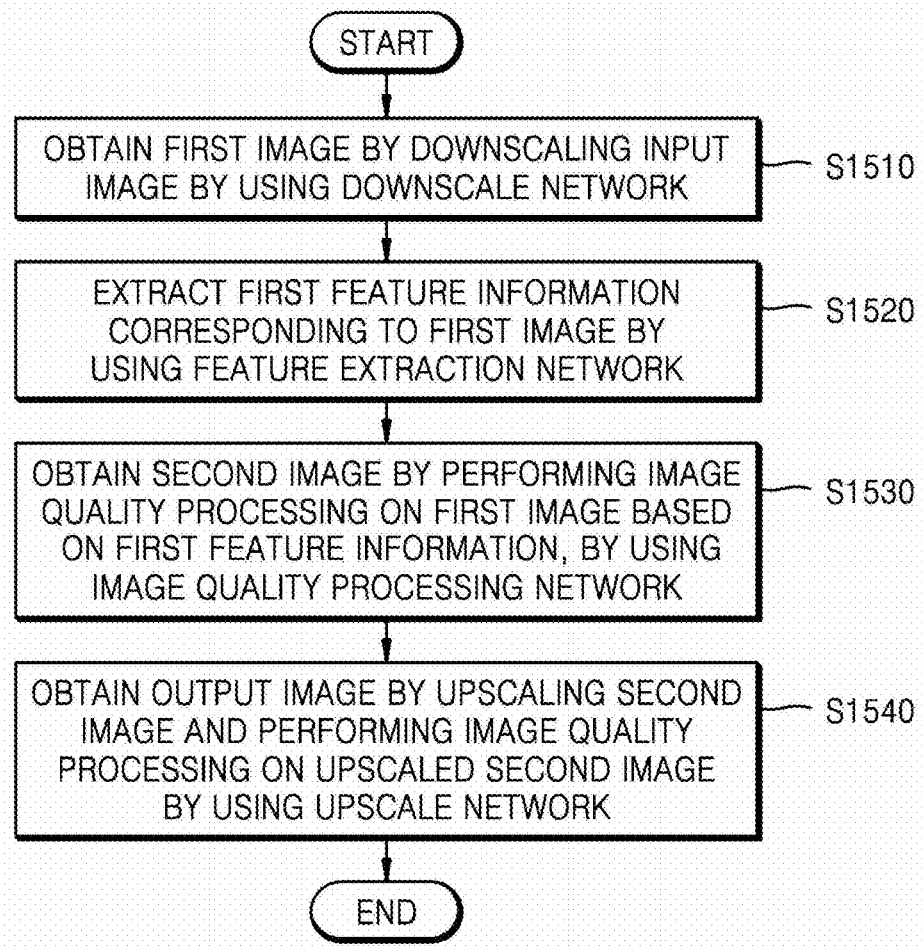

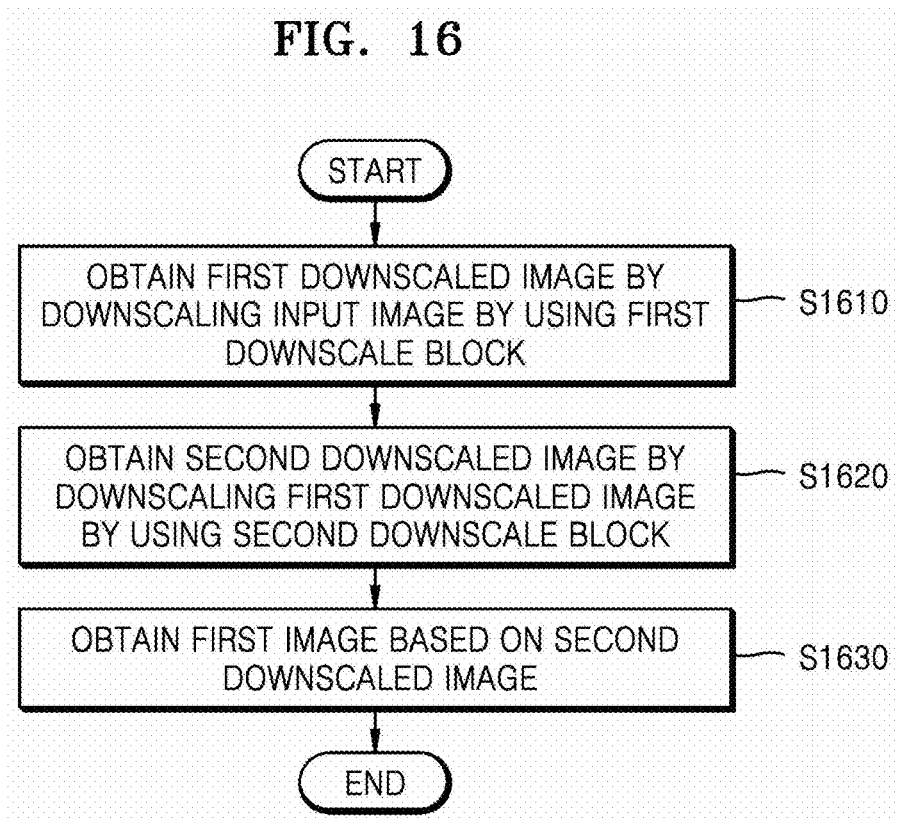

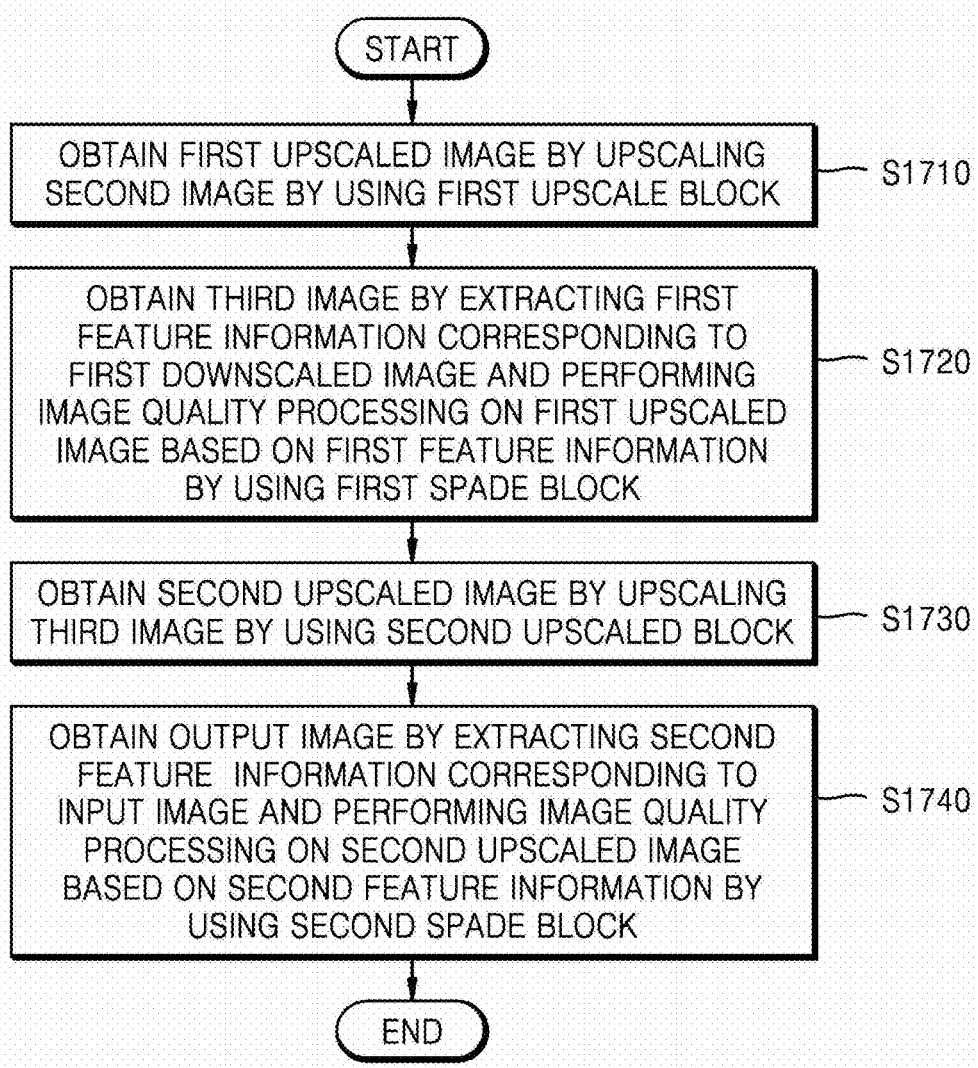

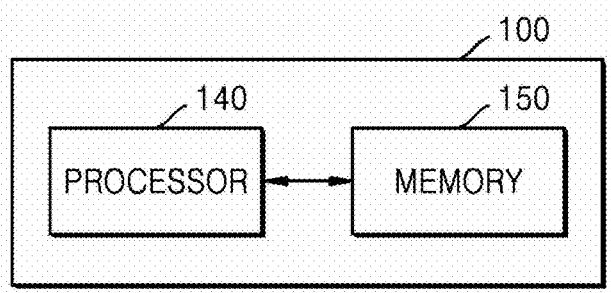

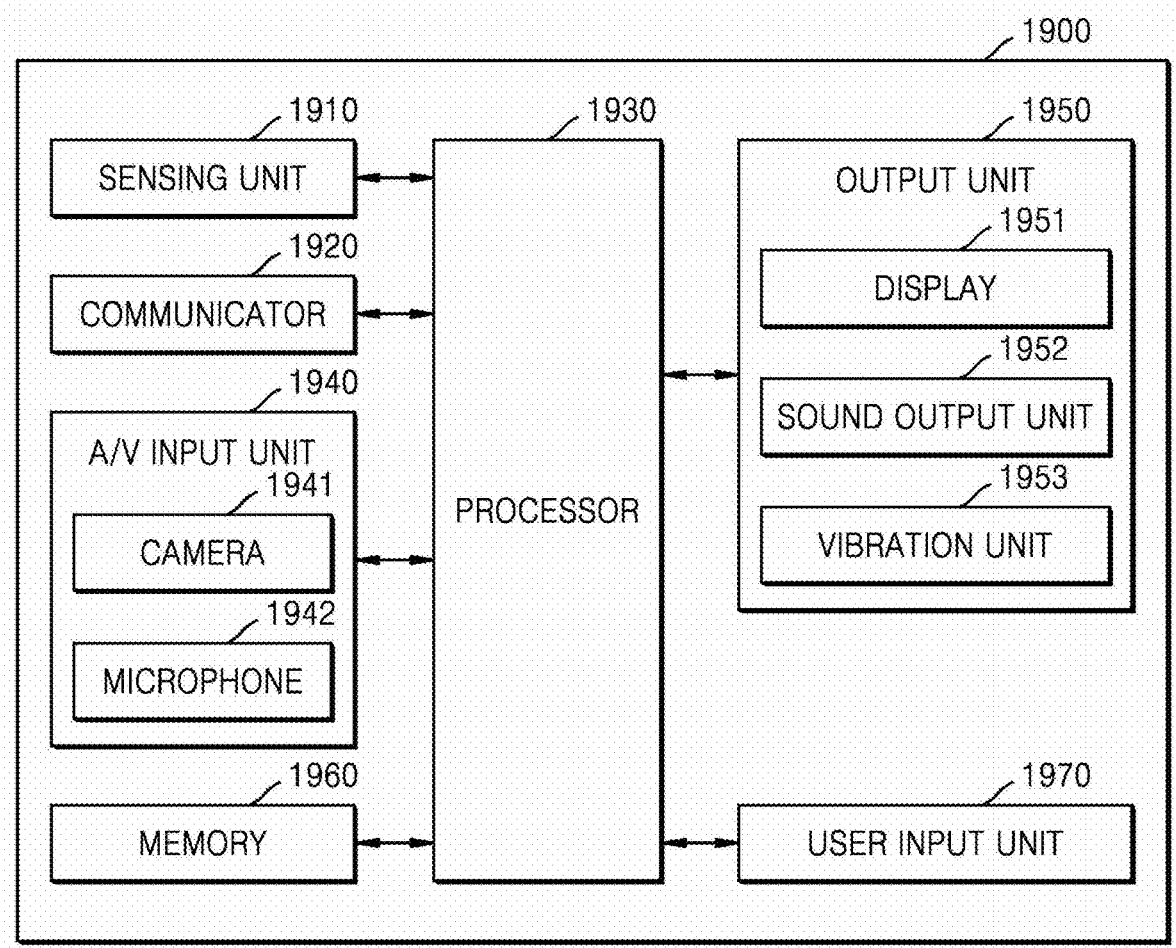

IMAGE PROCESSING APPARATUS AND OPERATING METHOD THEREOF

CROSS-REFERENCE TO RELATED APPLICATION

This application is a bypass continuation of International Application No. PCT/KR2022/004156, filed on Mar. 24, 2022, which is based on and claims priority to Korean Patent Application No. 10-2021-0101025, filed on Jul. 30, 2021 and Korean Patent Application No. 10-2021-0176998, filed on Dec. 10, 2021, in the Korean Intellectual Property Office, the disclosures of which are incorporated by reference herein in their entireties.

BACKGROUND

1. Field

Various embodiments relate to an image processing apparatus for performing image quality processing by using a neural network, and an operating method of the image processing apparatus.

2. Description of the Related Art

As data traffic increases exponentially along with the development of computer technology, artificial intelligence has become an important trend for driving future innovation. Artificial intelligence is a method that mimics human thinking, and is thus applicable to virtually all industries limitlessly. Examples of representative technologies of artificial intelligence include pattern recognition, machine learning, expert systems, neural networks, and natural language processing.

A neural network models the characteristics of biological nerve cells of humans by using mathematical expressions, and uses an algorithm that mimics a human's learning ability. Through this algorithm, the neural network may generate a mapping between input data and output data, and the ability to generate this mapping can be expressed as the learning ability of the neural network. In addition, the neural network has a generalization ability to generate correct output data with respect to input data that has not been used for learning, based on a learning result.

When image quality processing (e.g., denoising) is performed by using a deep neural network (e.g., a deep convolutional neural network (CNN)), adaptive processing may be performed according to local characteristics of pixels. However, when the number of layers included in a CNN is reduced due to the limitation of the amount of computation, adaptive processing performance deteriorates.

SUMMARY

Various embodiments may provide an image processing apparatus for performing image quality processing by using a convolutional neural network, and an operating method of the image processing apparatus.

According to an aspect of an example embodiment of the disclosure, an image processing apparatus for performing image quality processing on an image includes: a memory configured to store one or more instructions; and a processor configured to execute the one or more instructions stored in the memory to: obtain a first image by downscaling an input image by using a downscale network including at least one downscale block; extract first feature information corresponding to the first image by using a feature extraction network including at least one feature extraction block; obtain a second image by performing image quality processing on the first image based on the first feature information, by using an image quality processing network including at least one modulation block; and obtain an output image by upscaling the second image and performing image quality processing on the upscaled second image, by using an upscale network, the upscale network including at least one upscale block and at least one spade block, and the processor is further configured to execute the one or more instructions to, by using the at least one spade block, extract second feature information corresponding to the input image and perform image quality processing on the upscaled second image based on the second feature information.

According to an embodiment of the disclosure, the downscale network may include a first downscale block and a second downscale block, and the processor may be further configured to execute the one or more instructions to: obtain a first downscaled image by downscaling the input image by using the first downscale block; obtain a second downscaled image by downscaling the first downscaled image by using the second downscale block, the first downscaled image being received from the first downscale block; and obtain the first image based on the second downscaled image.

According to an embodiment of the disclosure, the upscale network may include a first upscale block, a first spade block, a second upscale block, and a second spade block, and the processor may be further configured to execute the one or more instructions to: obtain a first upscaled image by upscaling the second image by using the first upscale block; obtain a third image by extracting third feature information corresponding to the first downscaled image and performing image quality processing on the first upscaled image based on the third feature information, by using the first spade block; obtain a second upscaled image by upscaling the third image by using the second upscale block; and obtain the output image by extracting the second feature information corresponding to the input image and performing image quality processing on the second upscaled image based on the second feature information, by using the second spade block.

According to an embodiment of the disclosure, a resolution of the first upscaled image may be equal to a resolution of the first downscaled image, and a resolution of the second upscaled image may be equal to a resolution of the input image.

According to an embodiment of the disclosure, the processor is further configured to execute the one or more instructions to, by using the first spade block, extract the third feature information, the third feature information including a first feature map and a second feature map, perform a first operation between the first upscaled image and the first feature map, and perform a second operation between a value obtained by performing the first operation and the second feature map.

According to an embodiment of the disclosure, the first operation may be a multiplication operation, and the second operation may be a summation operation.

According to an embodiment of the disclosure, the first feature information extracted from the feature extraction network may include at least one of edge information, shadow region information, luminance information, transform noise information, or texture information about the first image.

According to an embodiment of the disclosure, the at least one feature extraction block may include a plurality of convolutional layers and a skip connection, the plurality of convolutional layers being consecutive, and the skip connection being configured to skip at least one of the plurality of convolutional layers.

According to an embodiment of the disclosure, the at least one feature extraction block may further include: a residual scaler configured to adjust sizes of skip-connected values; and a normalization layer configured to adjust a range of result values of a convolutional operation from the plurality of convolutional layers.

According to an embodiment of the disclosure, the at least one feature extraction block may include a first convolutional layer and a second convolutional layer, and the skip connection may be configured to connect an input of the first convolutional layer to an output of the second convolutional layer.

According to an embodiment of the disclosure, the at least one modulation block may include a convolutional layer, a modulation layer, and a weight map generator, the modulation layer being configured to receive a first feature map output from the convolutional layer, and the weight map generator may be configured to generate at least one weight map based on the first feature information, and the processor may be further configured to execute the one or more instructions to, in the modulation layer, generate the second feature map by applying the at least one weight map to the first feature map.

According to an embodiment of the disclosure, the at least one weight map may include a first weight map and a second weight map, and the processor may be further configured to execute the one or more instructions to, in the modulation layer, generate the second feature map by performing a first operation between the first feature map and the first weight map and performing a second operation between a value obtained by performing the first operation and the second weight map.

According to an embodiment of the disclosure, the at least one modulation block may include a plurality of convolutional layers and a skip connection, the skip connection being configured to skip at least one of the plurality of convolutional layers.

According to an aspect of an example embodiment of the disclosure, a method of operating an image processing apparatus includes: obtaining, by using a downscale network comprising at least one downscale block, a first image by downscaling an input image; extracting, by using a feature extraction network comprising at least one feature extraction block, first feature information corresponding to the first image; obtaining, by using an image quality processing network comprising at least one modulation block, a second image by performing image quality processing on the first image based on the first feature information; and obtaining, by using an upscale network, an output image by upscaling the second image and performing image quality processing on the upscaled second image, the upscale network comprising at least one upscale block and at least one spade block, and the obtaining of the output image by upscaling the second image and performing image quality processing on the upscaled second image includes, by using the at least one spade block, extracting second feature information corresponding to the input image and performing image quality processing on the upscaled second image based on the second feature information.

According to an embodiment of the disclosure, an image processing apparatus may downscale an image and perform image quality processing by using the downscaled image, thereby increasing processing speed and reducing memory usage.

An image on which image quality processing has been performed may be upscaled by using image information about an image before being downscaled and image information about a downscaled image, and accordingly, the performance of image quality processing may be improved.

BRIEF DESCRIPTION OF THE DRAWINGS

The above and other objects and features of the disclosure will become apparent by describing in detail example embodiments thereof with reference to the accompanying drawings.

FIG. 15 is a flowchart of an operating method of an image processing apparatus, according to an embodiment of the disclosure.

FIG. 16 is a flowchart of operations included in operation 1510 of FIG. 15.

FIG. 17 is a flowchart of operations included in operation 1540 of FIG. 15.

FIG. 18 is a block diagram of a configuration of an image processing apparatus, according to an embodiment of the disclosure.

FIG. 19 is a block diagram of a configuration of an image processing apparatus, according to another embodiment of the disclosure.

DETAILED DESCRIPTION

Figure 1:
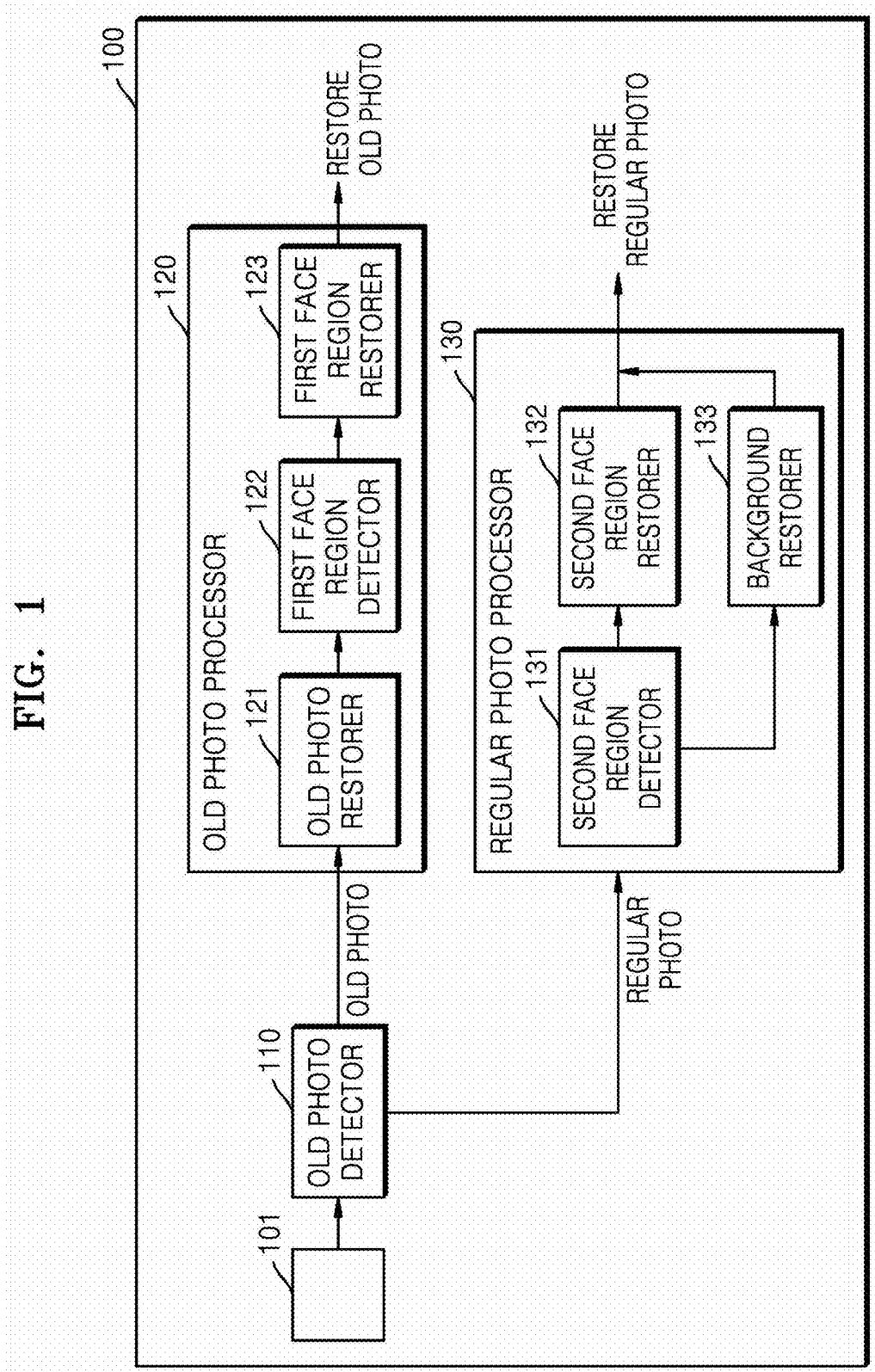
FIG. 1 is a diagram of an operation, performed by an image processing apparatus, of processing an input image, according to an embodiment of the disclosure.

Hereinafter, example embodiments according to the disclosure will be described with reference to the accompanying drawings.

Throughout the disclosure, the expression "at least one of a, b or c" indicates only a, only b, only c, both a and b, both a and c, both b and c, all of a, b, and c, or variations thereof.

The terms used herein will be briefly described, and the disclosure will be described in detail.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

It will be understood that when a certain part "includes" a certain component, the part does not exclude another component but may further include another component, unless the context clearly dictates otherwise. The terms "unit", " . . . er/or", and "module" when used in this specification refers to a unit in which at least one function or operation is performed, and may be implemented as hardware, software, or a combination of hardware and software.

The disclosure will now be described more fully with reference to the accompanying drawings for one of ordinary skill in the art to be able to perform the disclosure without any difficulty. However, the disclosure may be embodied in many different forms and is not limited to the embodiments of the disclosure set forth herein. For clarity, portions irrelevant to the descriptions of the disclosure are omitted in the drawings, and like components are denoted by like reference numerals throughout the specification.

FIG. 1 is a diagram of an operation, performed by an image processing apparatus, of processing an input image, according to an embodiment of the disclosure.

According to an embodiment of the disclosure, an image processing apparatus 100 may be implemented as various types of electronic devices such as a mobile phone, a digital camera, a camcorder, a laptop computer, a desktop computer, an electronic book terminal, a digital broadcasting terminal, a personal digital assistant (PDA), a portable multimedia player (PMP), a navigation device, an MP3 player, an Internet protocol television (IPTV), a digital TV (DTV), a wearable device, etc.

Referring to FIG. 1, according to an embodiment of the disclosure, the image processing apparatus 100 may perform a process of improving an image quality of an input image 101. For example, the input image 101 may be an old photo or a portrait, but is not limited thereto.

According to an embodiment of the disclosure, the image processing apparatus 100 may include an old photo detector 110, an old photo processor 120, and a regular photo processor 130.

The old photo detector 110 may receive the input image 101 and determine whether the input image 101 is an old photo. For example, the old photo detector 110 may perform image processing on the input image 101 to obtain characteristic information about the input image 101 including information indicating whether the input image 101 has faded, color distribution information about the input image 101, noise information about the input image 101, etc. The old photo detector 110 may determine whether the input image 101 is an old photo based on the obtained characteristic information about the input image 101.

Alternatively, the old photo detector 110 may determine whether the input image 101 is an old photo by using a classification network. This will be described in detail with reference to FIG. 2.

Figure 2:
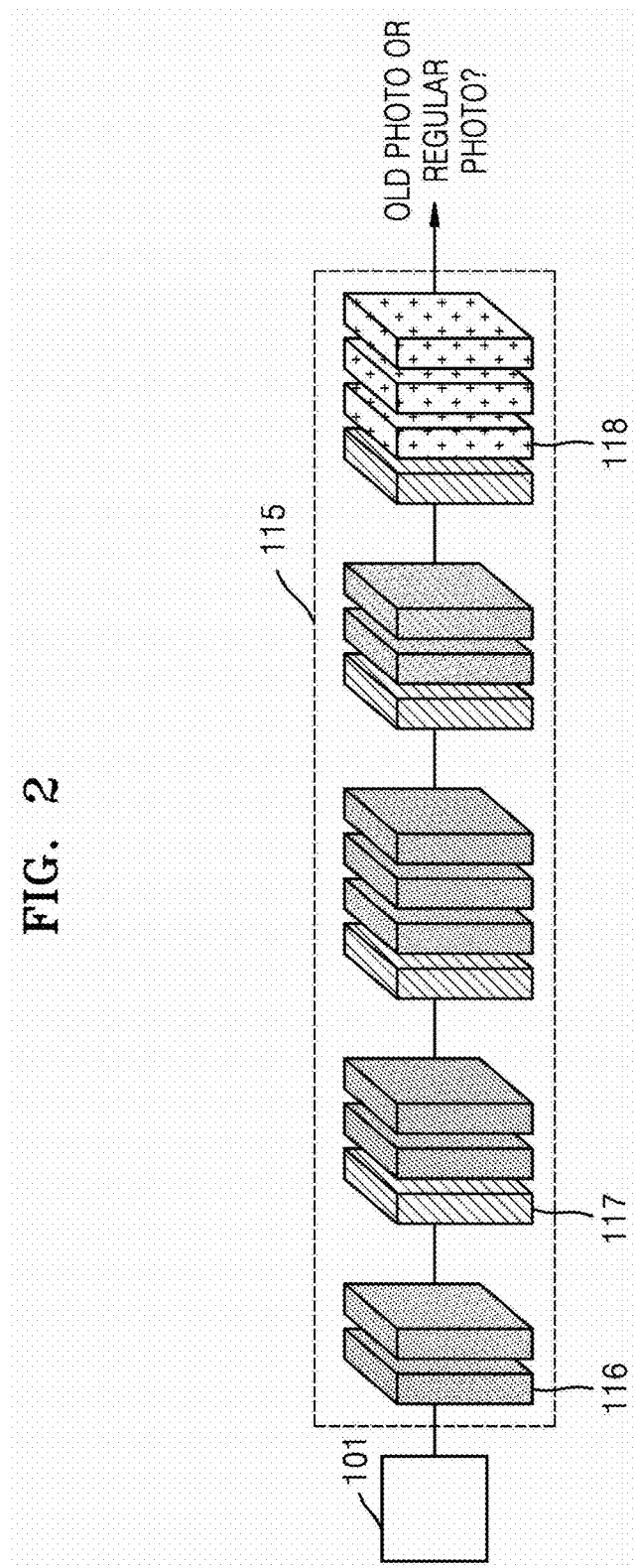
FIG. 2 is a diagram of a classification network according to an embodiment of the disclosure.

FIG. 2 is a diagram of a classification network according to an embodiment of the disclosure.

According to an embodiment of the disclosure, a classification network 115 may be a two-class classification model that classifies the input image 101 into two types or may be a model that classifies the input image 101 as an old photo or a regular photo. For example, referring to FIG. 2, the classification network 115 may include a VGG network including a plurality of convolutional layers 116, a plurality of pooling layers 117, and a plurality of fully connected layers 118. However, the disclosure is not limited thereto, and the classification network may include various structures.

Also, the old photo detector 110 may extract a portion of the input image 101 and input the portion of the input image 101 into the classification network 115. Accordingly, an operation of detecting whether the input image 101 is an old photo may be quickly performed.

Referring back to FIG. 1, when the old photo detector 110 classifies the input image 101 as an old photo, the old photo processor 120 may perform image processing on the input image 101.

According to an embodiment of the disclosure, the old photo processor 120 may include an old photo restorer 121, a first face region detector 122, and a first face region restorer 123. The input image 101 may be input into the old photo restorer 121, and the old photo restorer 121 may perform image processing on the input image 101 by applying an old photo restoration model thereto. An image processed by the old photo restoration model may be input into the first face region detector 122. The first face region detector 122 may detect a face region by using various algorithms and various models. For example, the first face region detector 122 may detect the face region by using a histogram-of-oriented-gradient (HoG)-based feature detection algorithm. The first face region detector 122 may divide an input image into regions having a certain size and calculate a gradient of pixels for each region. The first face region detector 122 may calculate, for each region, a histogram for directions of pixels having a gradient greater than or equal to a certain value among pixels included in one region and may determine whether the region is a face region based on the calculated histogram. Alternatively, the first face region detector 122 may detect the face region by using the classification network, but is not limited thereto.

When a first image includes the face region, the first face region restorer 123 may perform image processing for restoring an image quality of the face region included in the first image by using a face restoration model. Accordingly, the old photo processor 120 may obtain a restored old photo.

In contrast, when the old photo detector 110 classifies the input image 101 as a regular photo rather than an old photo, the regular photo processor 130 may perform image processing on the input image 101.

According to an embodiment of the disclosure, the regular photo processor 130 may include a second face region detector 131, a second face region restorer 132, and a background restorer 133. The input image 101 classified as a regular photo may be input into the second face region detector 131, and the second face region detector 131 may detect whether the input image 101 includes a face region by using the same or similar method to that of the first face region detector 122.

When the input image 101 includes the face region, the second face region restorer 132 may perform image processing for restoring an image quality of the face region included in the input image 101 by using the face restoration model. Also, the background restorer 133 may perform image processing for restoring an image quality of a background region rather than the face region included in the input image 101 by using a background restoration model.

The regular photo processor 130 may obtain a restored regular photo by synthesizing the face region whose image quality has been restored by the second face region restorer 132 and the background region whose image quality has been restored by the background restorer 133.

Moreover, according to an embodiment of the disclosure, the old photo restoration model, the face restoration model, and the background restoration model may include an image processing network having the same or similar structure, and the image processing network may include at least one network (or at least one neural network). Hereinafter, the image processing network will be described with reference to the accompanying drawings.

Figure 3:
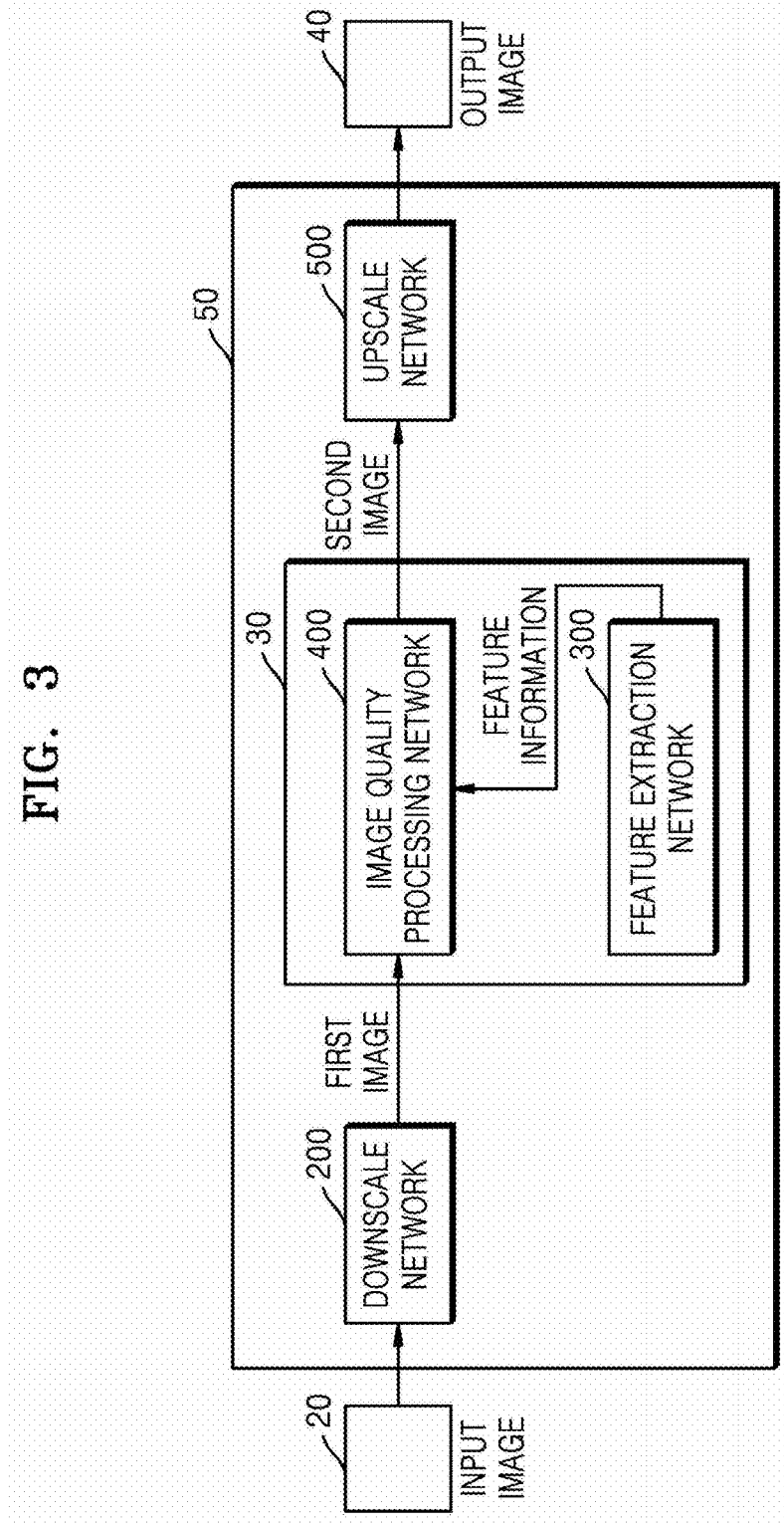
FIG. 3 is a diagram for describing an image processing network according to an embodiment of the disclosure.

FIG. 3 is a diagram for describing an image processing network according to an embodiment of the disclosure.

Referring to FIG. 3, according to an embodiment of the disclosure, an image processing network 50 may include a downscale network 200, a feature extraction network 300, an image quality processing network 400, and an upscale network 500. According to an embodiment of the disclosure, the image processing apparatus 100 may perform image quality processing (e.g., image quality processing of an old photo, image quality processing on a face region, image quality processing on a background region, etc.) by using the image processing network 50. The image quality processing may include various processing to enhance quality of an image such as, for example, denoising, de-lighting effects, and contrast and sharpness adjustment (such as improving contrast and sharpness).

For example, according to an embodiment of the disclosure, the downscale network 200 may generate a first image by receiving an input image 20 and downscaling the input image 20. In this case, the downscale network 200 may hierarchically downscale the input image 20. For example, the downscale network 200 may downscale a resolution of the input image 20 to ½ and downscale again the image whose resolution has been downscaled to ½, to obtain a first image in which the resolution of the input image 20 has been downscaled to ¼. An operation, performed by the downscale network 200, of downscaling an input image will be described in detail with reference to FIG. 4.

The downscaled first image may be input into the image quality processing network 400 and the feature extraction network 300.

According to an embodiment of the disclosure, the feature extraction network 300 may receive the first image, extract at least one piece of feature information from the first image, and transmit the at least one piece of extracted feature information to the image quality processing network 400. The image quality processing network 400 may perform a process of improving an image quality of the first image by using the at least one piece of feature information received from the feature extraction network 300. For example, the image quality processing network 400 may remove noise or artifacts included in the first image and may perform a process of improving structural information such as edges of the first image, and detailed texture information. However, the disclosure is not limited thereto.

In a main network 30 including the feature extraction network 300 and the image quality processing network 400, image quality processing is performed on a downscaled image, and accordingly, image processing speed may be increased and memory usage may be reduced.

A second image obtained by the image quality processing network 400 performing image quality processing may be input into the upscale network 500.

According to an embodiment of the disclosure, the upscale network 500 may generate an output image 40 by upscaling the second image. The upscale network 500 may obtain a third image by upscaling the second image and may receive, from the downscale network 200, image information before downscaling is performed. The upscale network 500 may perform image quality processing on the upscaled third image based on the image information received from the downscale network 200 and may obtain the output image 40 based on the third image on which image quality processing has been performed.

Image processing operations performed by the downscale network 200, the feature extraction network 300, the image quality processing network 400, and the upscale network 500, according to an embodiment of the disclosure, will be described with reference to the drawings below.

Figure 4:
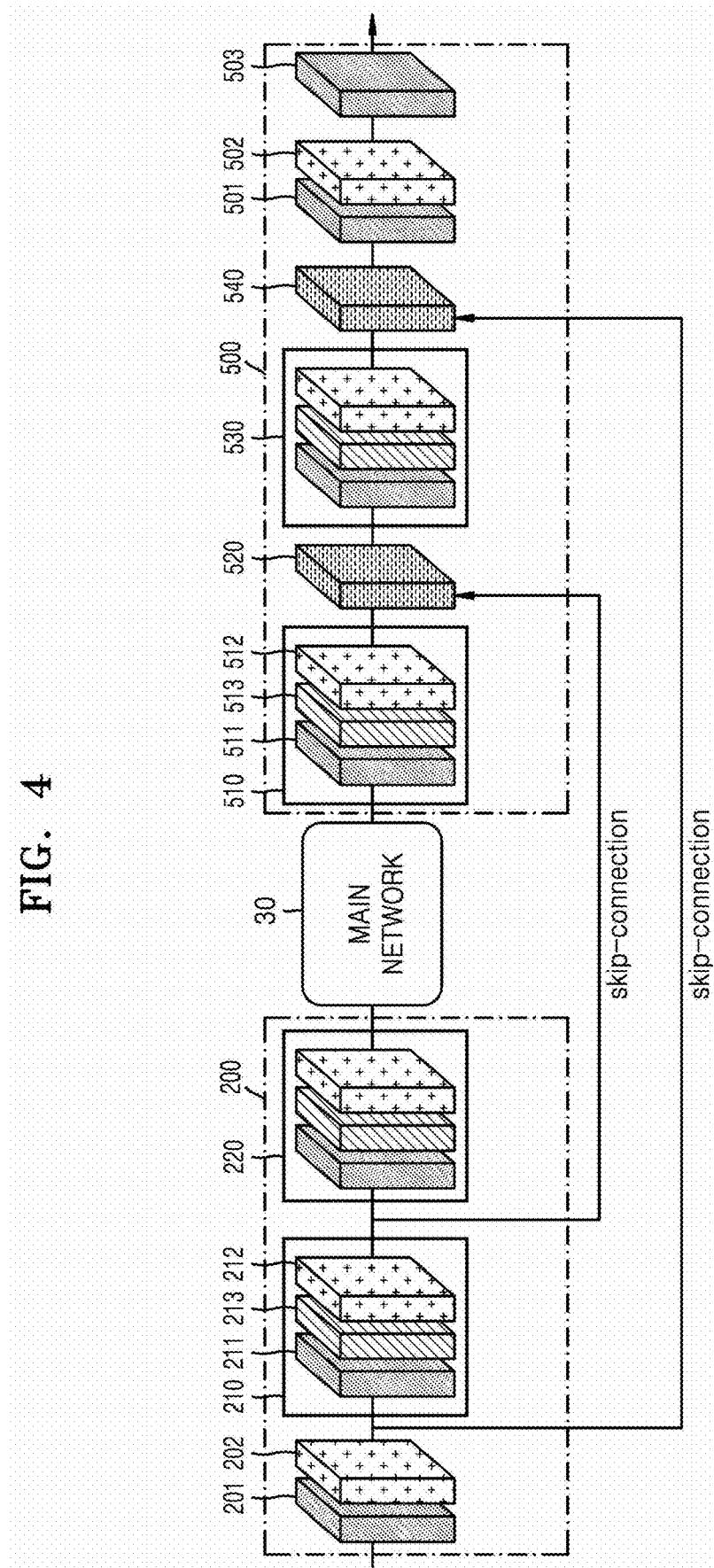
FIG. 4 is a diagram of structures of a downscale network and an upscale network, according to an embodiment of the disclosure.

FIG. 4 is a diagram of structures of a downscale network and an upscale network, according to an embodiment of the disclosure.

Referring to FIG. 4, according to an embodiment of the disclosure, the downscale network 200 may include at least one downscale block. Although it has been illustrated in FIG. 4 for convenience of description, that the downscale network 200 includes a first downscale block 210 and a second downscale block 220, the disclosure is not limited thereto. The downscale network 200 may include one downscale block or may include at least three downscale blocks.

The first downscale block 210 and the second downscale block 220 may be sequentially connected, and the downscale network 200 may further include a convolutional layer 201 and an activation layer 202, before the first downscale block 210. However, the disclosure is not limited thereto.

According to an embodiment of the disclosure, the first downscale block 210 may include at least one convolutional layer 211 and at least one activation layer 212. Also, the first downscale block 210 may include at least one space-to-depth layer 213. For example, as illustrated in FIG. 4, the first downscale block 210 may have a structure in which a convolutional layer 211, a space-to-depth layer 213, and an activation layer 212 are sequentially positioned, so that data output from the convolutional layer 211 is input into the space-to-depth layer 213 and data output from the space-to-depth 213 is input into the activation layer 212. However, the disclosure is not limited thereto.

According to an embodiment of the disclosure, in the convolutional layer 211, a convolutional operation between data input into the convolutional layer 211 and a kernel included in the convolutional layer 211 may be performed. In the space-to-depth layer 213, an operation of reducing a resolution of the data input into the space-to-depth layer 213 and increasing the number of channels as much as the resolution is reduced may be performed.

The space-to-depth layer 213 may be a layer that changes resolution information into depth information. Accordingly, information included in the data input into the space-to-depth layer 213 may be equally included in the data output from the space-to-depth layer 213.

In the activation layer 212, an activation function operation of applying an activation function to the data input into the activation layer 212 may be performed. The activation function operation applies non-linear characteristics to an activation layer, and the activation function may include a sigmoid function, a Tan h function, a rectified linear unit (ReLU) function, a leaky ReLU function, etc. However, the disclosure is not limited thereto.

According to an embodiment of the disclosure, the first downscale block 210 may generate a first downscaled image by downscaling an image input into the first downscale block 210 by using the convolutional layer 211, the space-to-depth layer 213, and the activation layer 212, which are included in the first downscale block 210. In this regard, the first downscaled image may be an image obtained by reducing a resolution of the image input into the first downscale block 210 to 1/k1. For example, a value of k1 may be 2, and a resolution of the first downscaled image may be ½ of the resolution of the input image. However, the disclosure is not limited thereto.

The value of k1 may be variously determined according to the configuration of layers included in the first downscale block 210. For example, the value of k1 may vary according to a kernel of each of the convolutional layers included in the first downscale block 210.

The first downscaled image output from the first downscale block 210 may be input into the second downscale block 220. However, the disclosure is not limited thereto.

According to an embodiment of the disclosure, the second downscale block 220 may include the same or similar structure to that of the first downscale block 210. The second downscale block 220 may generate a second downscaled image by downscaling the first downscaled image. In this regard, the second downscaled image may be an image obtained by reducing the resolution of the first downscaled image to 1/k2. For example, k2 may have a value of 2, and a resolution of the second downscaled image may be ½ of the resolution of the first downscaled image, but is not limited thereto.

The value of k2 may be variously determined according to the configuration of layers included in the second downscale block 220. For example, the value of k2 may vary according to a kernel of each of the convolutional layers included in the second downscale block 220.

The second downscaled image output from the second downscale block 220 may be input into the image quality processing network 400 and the feature extraction network 300. The image quality processing network 400 and the feature extraction network 300 will be described in detail below with reference to FIGS. 5 to 10.

Figure 5:
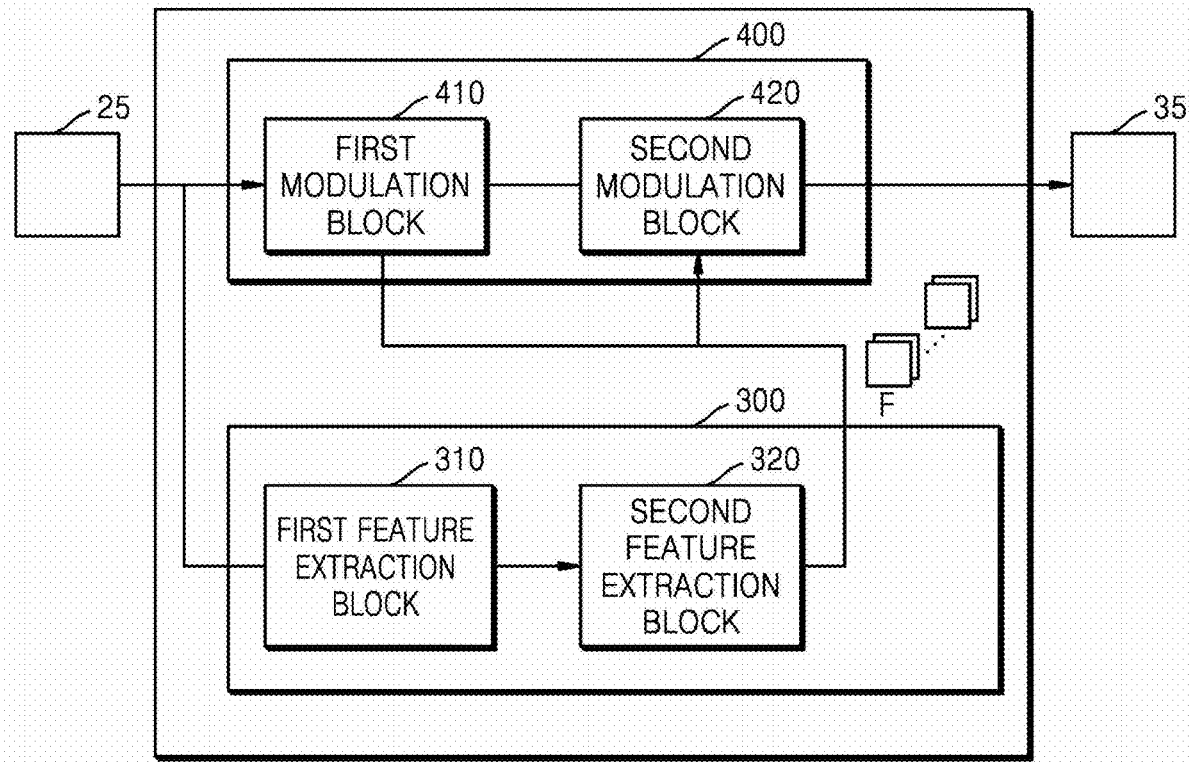
FIG. 5 is a diagram of structures of an image quality processing network and a feature extraction network, according to an embodiment of the disclosure.

FIG. 5 is a diagram of structures of an image quality processing network and a feature extraction network, according to an embodiment of the disclosure.

Referring to FIG. 5, according to an embodiment of the disclosure, the feature extraction network 300 may include at least one feature extraction block. Although it has been illustrated in FIG. 5 for convenience of description, that the feature extraction network 300 includes a first feature extraction block 310 and a second feature extraction block 320, the feature extraction network 300 may include a larger number of feature extraction blocks. Also, the first feature extraction block 310 and the second feature extraction block 320 may be sequentially connected.

In FIG. 5, it has been illustrated that a first image 25 is directly input into the first feature extraction block 310, but the disclosure is not limited thereto. For example, a convolutional layer and an activation layer are positioned before the first feature extraction block 310, and accordingly, an image obtained by performing a certain operation on the first image 25 may be input into the first feature extraction block 310. Also, another feature extraction block, a convolutional layer, and an activation layer may be further positioned between the first feature extraction block 310 and the second feature extraction block 320. Hereinafter, the structure and operations of the first feature extraction block 310, according to an embodiment of the disclosure, will be described with reference to FIG. 6.

Figure 6:
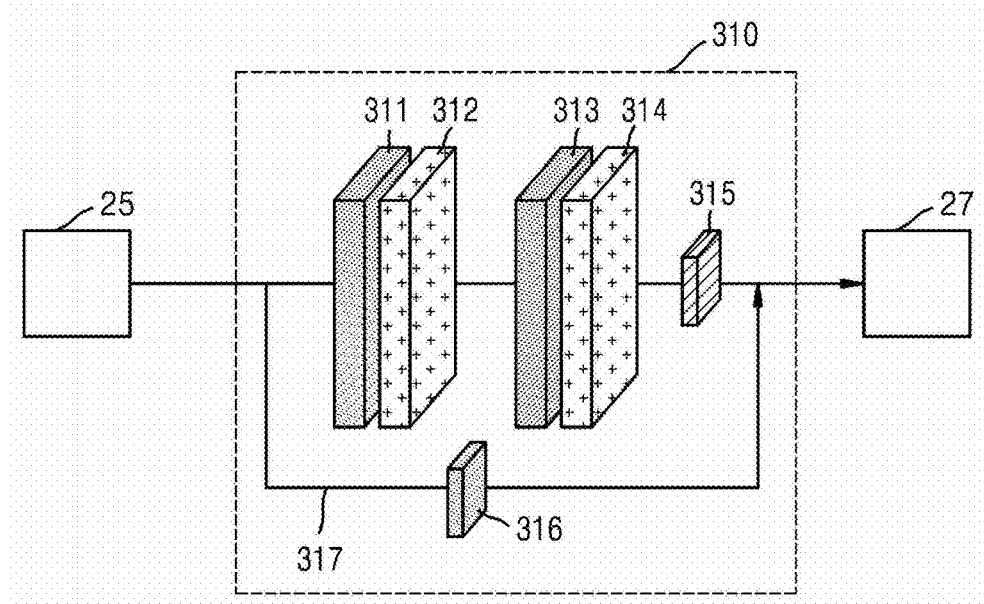
FIG. 6 is a diagram of a structure of a first feature extraction block, according to an embodiment of the disclosure.

FIG. 6 is a diagram of a structure of a first feature extraction block, according to an embodiment of the disclosure.

Referring to FIG. 6, according to an embodiment of the disclosure, the first feature extraction block 310 may include a plurality of convolutional layers and may include an activation layer consecutively positioned in each of the plurality of convolutional layers. For example, the first feature extraction block 310 may include a first convolutional layer 311 and a second convolutional layer 313, and a first activation layer 312 may be sequentially positioned after the first convolutional layer 311, and a second activation layer 314 may be sequentially positioned after the second convolutional layer 313. However, the disclosure is not limited thereto. For example, at least one convolutional layer and at least one activation layer may be further positioned between the first activation layer 312 and the second convolutional layer 313.

In the first convolutional layer 311, a first feature map F1 may be generated through a convolutional operation between the first image 25 input into the first convolutional layer 311 and a first kernel included in the first convolutional layer 311. The first feature map F1 may be input into the first activation layer 312, and an activation function operation of applying an activation function to the first feature map F1 may be performed in the first activation layer 312.

Also, a feature map output from the first activation layer 312 may be input into the second convolutional layer 313, and in the second convolutional layer 313, a second feature map may be generated through a convolutional operation between the feature map input into the second convolutional layer 313 and a second kernel included in the second convolutional layer 313.

The second feature map may be input into the second activation layer 314, and an activation function operation of applying an activation function to the second feature map may be performed in the second activation layer 314.

Also, the first feature extraction block 310 may further include a normalization layer 315. For example, according to an embodiment of the disclosure, when the image quality processing network 400 and the feature extraction network 300 are trained by the same loss function, a size of the feature extraction network 300 is smaller than a size of the image quality processing network 400, and accordingly, gradient exploding occurs in the feature extraction network 300. The gradient exploding means that a value of an updated gradient (slope) gradually increases (diverges) in a training process of a network, and as the value of the gradient (slope) gradually increases, parameter values (weight values) included in kernels also gradually increase, which results in a decrease in training speed and efficiency.

According to an embodiment of the disclosure, in order to prevent the occurrence of gradient exploding, the normalization layer 315 may adjust a range of values output from the second activation layer 314. For example, the normalization layer 315 may normalize values output from the second activation layer 314 to values of 0 or more and 255 or less or to values of −1 or more and 1 or less. According to an embodiment of the disclosure, a range of normalization may be determined according to hardware performance of the image processing apparatus 100.

Referring to FIG. 6, the first feature extraction block 310 may include a skip connection 317 that skips a plurality of convolutional layers (e.g., the first convolutional layer 311 and the second convolutional layer 313). The skip connection 317 may be a structure that connects an input of the first convolutional layer 311 to an output of the normalization layer 315. For example, because the first feature extraction block 310 includes the skip connection 317, an output image 27 may be generated by adding the first image 25 to a result of passing the first image 25 through the first convolutional layer 311 and the second convolutional layer 313. Accordingly, the first feature extraction block 310 may refer to a network that has learned a residual between the first image 25 and the output image 27.

The first feature extraction block 310 may further include a residual scaler 316 that adjusts sizes of skip-connected values. The residual scaler 316 may perform an operation of multiplying each of values included in the first image 25 by a preset constant value, to adjust sizes of values included in a feature of the first image 25 without losing feature information about the first image 25.

Although only the first feature extraction block 310 has been illustrated and described in FIG. 6, the second feature extraction block 320 may also have the same or similar structure as the first feature extraction block 310 and perform the same or similar operations as those of the first feature extraction block 310.

Figure 7:
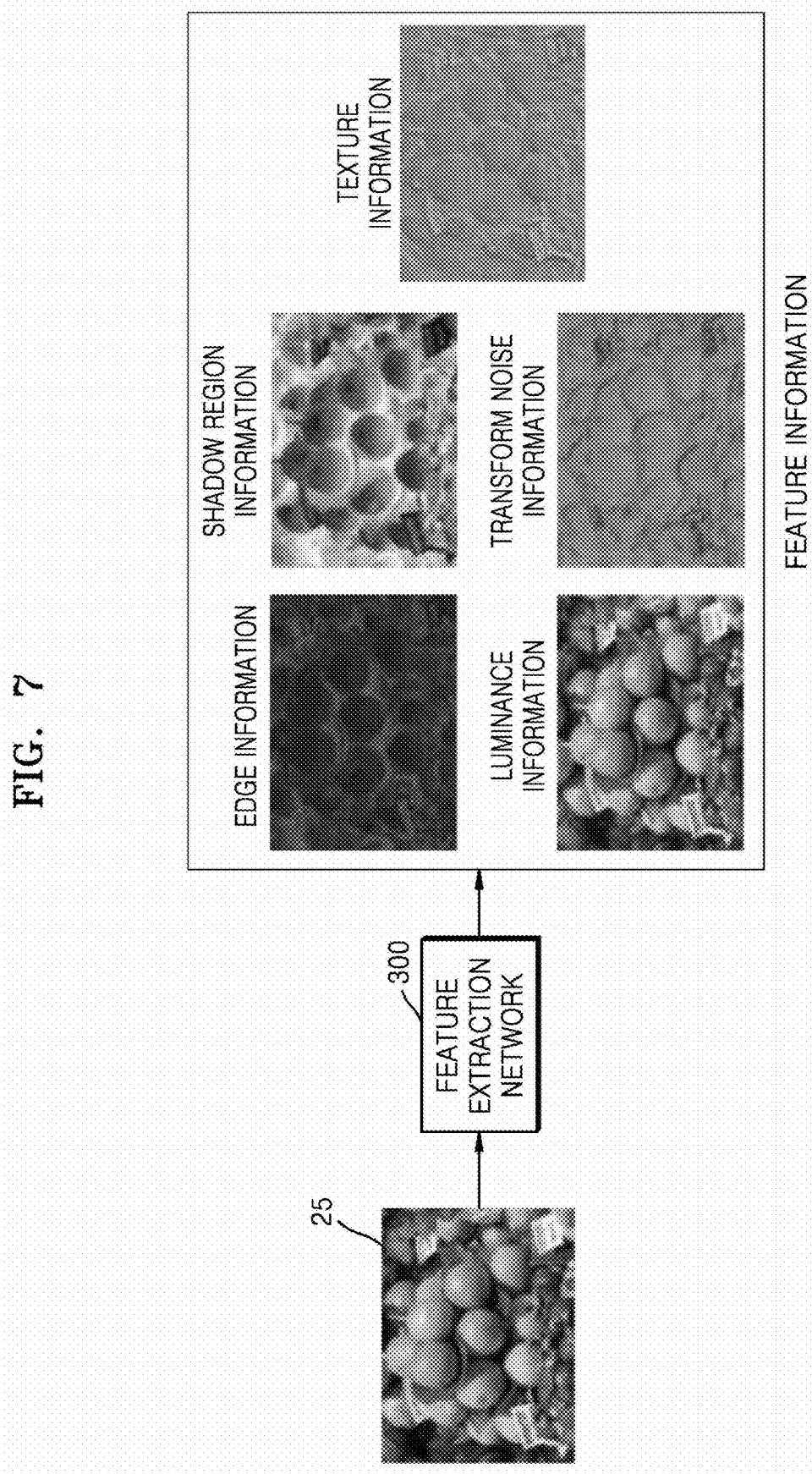
FIG. 7 is a diagram of feature information extracted from a feature extraction network, according to an embodiment of the disclosure.

FIG. 7 is a diagram of feature information extracted from a feature extraction network, according to an embodiment of the disclosure.

Referring to FIG. 7, according to an embodiment of the disclosure, the feature extraction network 300 may extract feature information about the first image 25 by using at least one feature extraction block. In this case, the feature information extracted from the feature extraction network 300 may include at least one of edge information, shadow region information, luminance information, transform noise information, or texture information about the first image 25.

Moreover, referring to FIG. 5, feature information F extracted from the feature extraction network 300 may be transmitted to the image quality processing network 400. For example, according to an embodiment of the disclosure, feature information generated through the first feature extraction block 310 and the second feature extraction block 320 may be transmitted to a first modulation block 410 and a second modulation block 420, which are included in the image quality processing network 400.

According to an embodiment of the disclosure, the image processing apparatus 100 may improve the image quality while maintaining edge information and texture information about the first image 25, by using feature information about the first image 25 in the image quality processing network 400, the feature information being extracted from the feature extraction network 300.

Referring to FIG. 5, according to an embodiment of the disclosure, the image quality processing network 400 may include at least one modulation block. Although it has been illustrated in FIG. 5 for convenience of description, that the image quality processing network 400 includes the first modulation block 410 and the second modulation block 420, the disclosure is not limited thereto. The image quality processing network 400 may include a larger number of modulation blocks.

In FIG. 5, it has been illustrated that the first image 25 is directly input into the first modulation block 410, but the disclosure is not limited thereto. For example, a convolutional layer and an activation layer are positioned before the first modulation block 410, and accordingly, an image obtained by performing a certain operation on the first image 25 may be input into the first modulation block 410.

Hereinafter, the structure and operations of the first modulation block 410, according to an embodiment of the disclosure, will be described with reference to FIG. 8.

Figure 8:
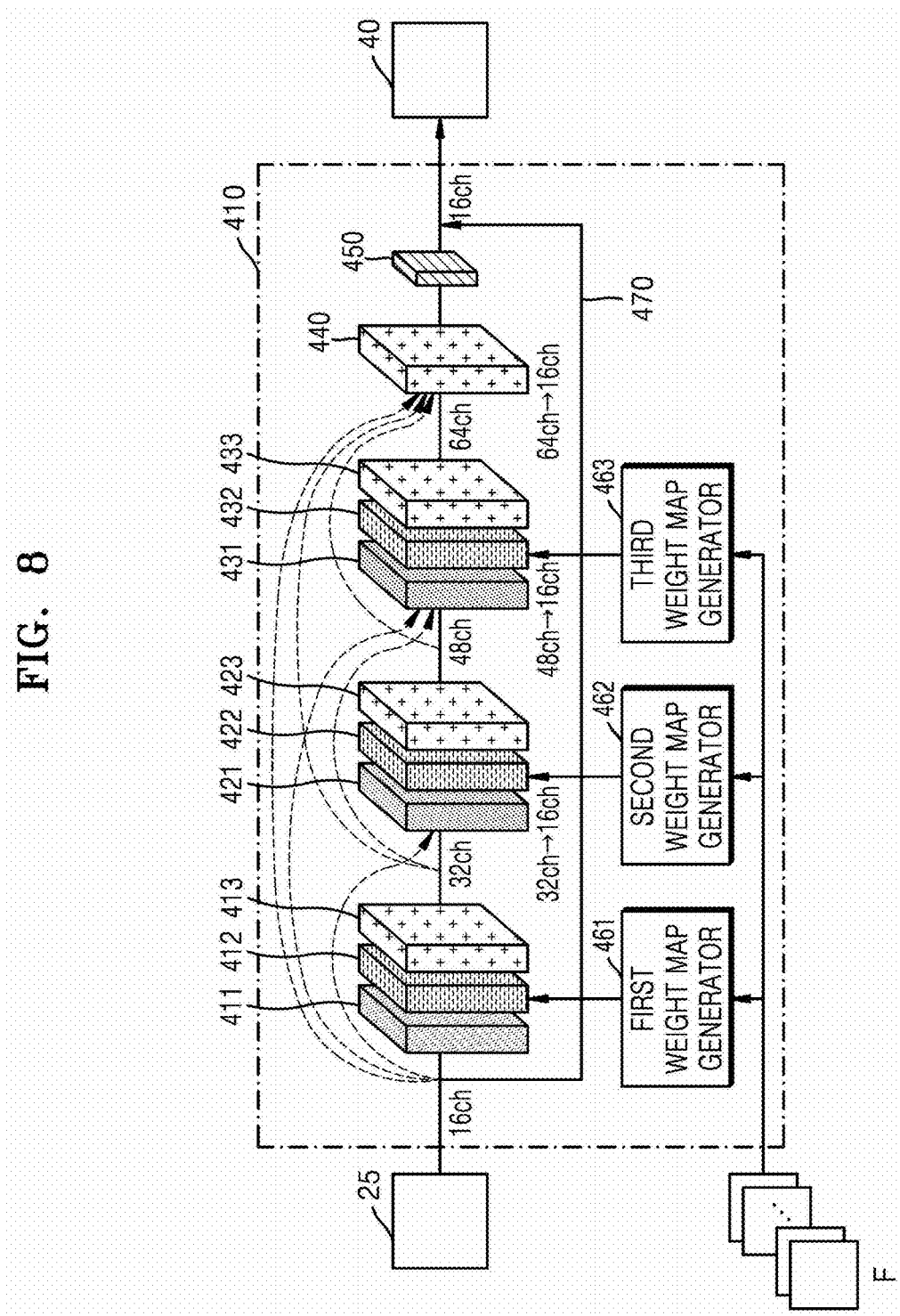
FIG. 8 is a diagram of a structure of a first modulation block, according to an embodiment of the disclosure.

FIG. 8 is a diagram of a structure of a first modulation block, according to an embodiment of the disclosure.

Referring to FIG. 8, according to an embodiment of the disclosure, the first modulation block 410 may include a plurality of convolutional layers and may include a modulation layer consecutively positioned in each of the plurality of convolutional layers. Also, the first modulation block 410 may include an activation layer consecutively positioned in the modulation layer. For example, a first convolutional layer 411, a first modulation layer 412, and a first activation layer 413 may be sequentially positioned, a second convolutional layer 421, a second modulation layer 422, and a second activation layer 423 may be sequentially positioned, and a third convolutional layer 431, a third modulation layer 432, and a third activation layer 433 may be sequentially positioned. Also, an output of the first activation layer 413 may be connected to an input of the second convolutional layer 421, and an output of the second activation layer 423 may be connected to an input of the third convolutional layer 431. However, the disclosure is not limited thereto.

In the first convolutional layer 411, a first feature map may be generated through a convolutional operation between the first image 25 input into the first convolutional layer 411 and a first kernel included in the first convolutional layer 411. The first feature map output from the first convolutional layer 411 may be input into the first modulation layer 412.

Moreover, according to an embodiment of the disclosure, the first modulation block 410 may further include a weight map generator corresponding to each of a plurality of modulation layers.

For example, the first modulation block 410 may include a first weight map generator 461 corresponding to the first modulation layer 412, a second weight map generator 462 corresponding to the second modulation layer 422, and a third weight map generator 463 corresponding to the third modulation layer 432.

According to an embodiment of the disclosure, each of the first to third weight map generators 461, 462, and 463 may generate a plurality of weight maps based on feature information F extracted from the feature extraction network 300.

Operations of the weight map generators will be described in detail with reference to FIG. 9.

Figure 9:
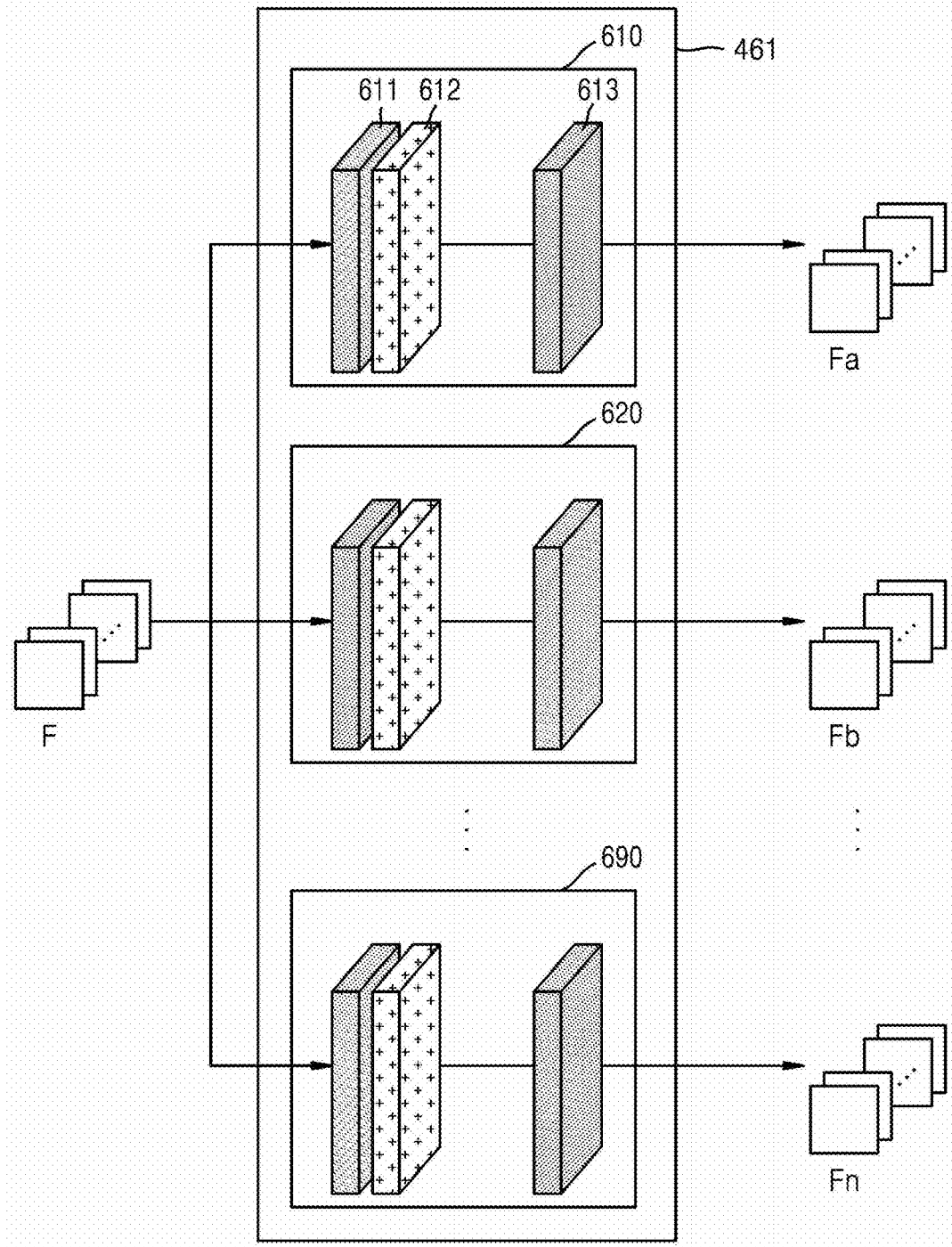
FIG. 9 is a diagram of a structure of a first weight map generator, according to an embodiment of the disclosure.

FIG. 9 is a diagram of a structure of a first weight map generator, according to an embodiment of the disclosure.

Referring to FIG. 9, the first weight map generator 461 may include at least one weight map generation block, and a weight map generation block may include a convolutional layer and an activation layer. For example, the first weight map generator 461 may include first to n-th weight map generation blocks 610, 620, . . . , 690, and the first to n-th weight map generation block 610, 620, . . . , 690 may be connected in parallel. Also, the first weight map generation block 610 may generate a first weight map Fa based on the feature information F extracted from the feature extraction network 300.

Referring to FIG. 9, the first weight map generation block 610 may include a first convolutional layer 611, an activation layer 612, and a second convolutional layer 613, which are sequentially positioned. However, the disclosure is not limited thereto. In the first convolutional layer 611, a first feature map may be generated through a convolutional operation between the feature information F input into the first convolutional layer 611 and a first kernel included in the first convolutional layer 611. The first feature map may be input into the activation layer 612, and an activation function operation of applying the activation function to the first feature map may be performed in the activation layer 612. A feature map output from the activation layer 612 may be input into the second convolutional layer 613, and in the second convolutional layer 613, the first weight map Fa may be generated through a convolutional operation between the feature map input into the second convolutional layer 613 and a second kernel included in the second convolutional layer 613.

In the same manner as the first weight map generation block 610, the second weight map generation block 620 may generate a second weight map Fb based on the feature information F, and the n-th weight map generation block 690 may generate an nth weight map Fn based on the feature information F.

Moreover, first to n-th weight maps Fa, Fb, Fn generated by the first weight map generator 461 may be input into the first modulation layer 412 of FIG. 8.

Referring back to FIG. 8, in the first modulation layer 412, a plurality of weight maps (e.g., the first to n-th weight maps Fa, Fb, Fn) received from the first weight map generator 461 may be applied to the first feature map output from the first convolutional layer 411.

An operation of performing modulation by applying the plurality of weight maps to the first feature map in the first modulation layer 412 will be described in detail with reference to FIG. 10.

Figure 10:
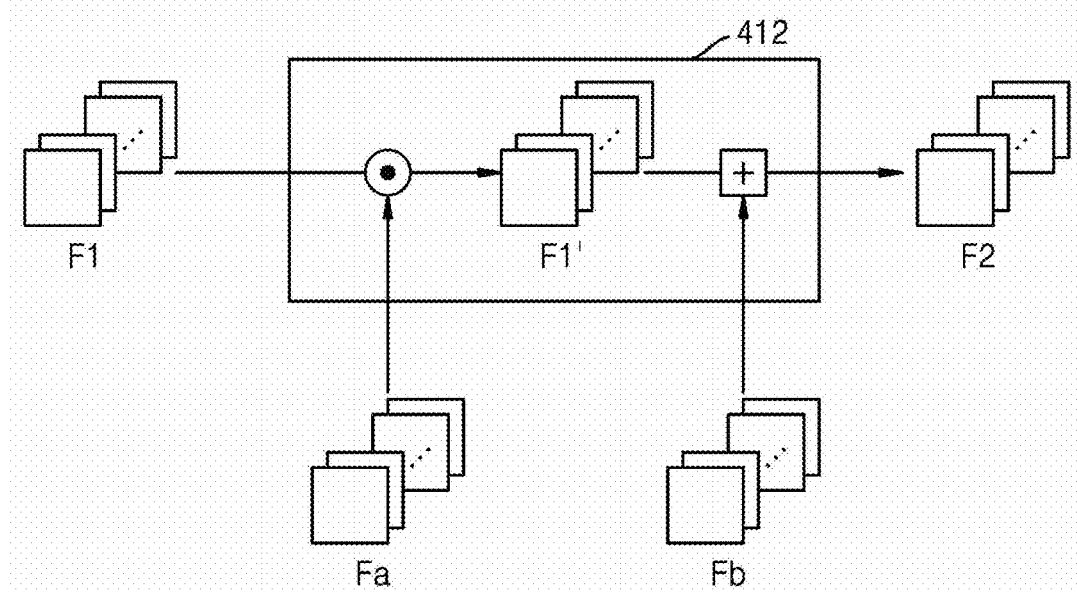
FIG. 10 is a diagram for describing a first modulation layer according to an embodiment of the disclosure.

FIG. 10 is a diagram for describing a first modulation layer according to an embodiment of the disclosure.

Referring to FIG. 10, according to an embodiment of the disclosure, the first modulation layer 412 may receive the first feature map F1 output from the first convolutional layer 411 and the first to n-th weighted values Fa, Fb, Fn output from the first weight map generator 461. In the first modulation layer 412, a second feature map F2 may be generated by performing various operations based on the first feature map F1 and the plurality of weight maps (e.g., the first to n-th weight maps Fa, Fb, Fn).

For example, as illustrated in FIG. 10, when the plurality of weight maps output from the first weight map generator 461 include the first weight map Fa and the second weight map Fb, in the first modulation layer 412, the second feature map F2 may be generated by performing a first operation between the first feature map F1 and the first weight map Fa and performing a second operation between a value F1' obtained by performing the first operation and the second weight map Fb.

In this case, the first operation and the second operation may be elementwise multiplication operations or elementwise summation operations, and sizes of the first feature map F1, the first weight map Fa, and the second weight map Fb need to be the same in order to perform an elementwise operation. The elementwise operation means that when each of values included in the first feature map F1 and each of values included in a weight map are calculated, values in the same position are calculated.

For example, in the first modulation layer 412, an elementwise multiplication operation of the first feature map F1 and the first weight map Fa may be performed, and an elementwise summation operation of the second weight map Fb and a value F1' obtained by performing the elementwise multiplication operation may be performed. Alternatively, the first operation may be an elementwise summation operation and the second operation may be an elementwise multiplication operation, but are not limited thereto.

Moreover, according to an embodiment of the disclosure, various operations may be applied in the first modulation layer 412.

For example, as in any one of Equations 1 to 3 provided for illustrative purposes below, in the first modulation layer 412, the second feature map F2 may be generated by modulating the first feature map F1 based on the plurality of weight maps (e.g., the first to n-th weight maps Fa, Fb, Fn).

$$F2 = Fa \times F1^n + Fb \times F1^{n-1} + \ldots + Fn \quad \text{[Equation 1]}$$

$$F2 = Fa \times \log(F1^n) + Fb \times \log(F1^{n-1}) + \ldots + Fn \quad \text{[Equation 2]}$$

$$F2 = \exp(Fa \times F1) + \exp(Fb \times F1) + \ldots + \exp(Fn \times F1) \quad \text{[Equation 3]}$$

Referring back to FIGS. 8 and 10, the second feature map F2 output from the first modulation layer 412 may be input into the first activation layer 413, and an activation function operation of applying the activation function to the second feature map may be performed in the first activation layer 413.

Also, a feature map output from the first activation layer 413 may be input into the second convolutional layer 421.

In addition, the first image 25 may be input into the second convolutional layer 421. In this case, the feature map output from the first activation layer 413 and the first image 25 may be concatenated and input into the second convolutional layer 421. For example, when the feature map output from the first activation layer 413 has 16 channels and the first image 25 has 16 channels, 32 channels may be input into the second convolutional layer 421.

In the second convolutional layer 421, a third feature map may be generated through a convolutional operation between the feature map input into the second convolutional layer 421 and a second kernel included in the second convolutional layer 421. In this case, the number of channels of the output third feature map may be adjusted by adjusting the number of sub-kernels included in the second kernel. For example, the number of sub-kernels included in the second kernel is set to 16, and a convolutional operation between the second kernel and the feature map (including 32 channels) input into the second convolutional layer 421 is performed so that the third feature map including 16 channels may be generated.

Also, the third feature map may be input into the second modulation layer 422, and a plurality of weight maps generated by the second weight map generator 462 may be input into the second modulation layer 422. The second weight map generator 462 may generate the plurality of weight maps in the same manner as the first weight map generator 461 described with reference to FIG. 9.

In the second modulation layer 422, a fourth feature map may be generated by applying the plurality of weight maps to the third feature map and performing modulation.

In the second modulation layer 422, the fourth feature map may be generated by modulating the third feature map in the same manner as the first modulation layer 412 described with reference to FIG. 10.

The fourth feature map may be input into the second activation layer 423, and an activation function operation of applying the activation function to the fourth feature map may be performed in the second activation layer 423.

Also, a feature map output from the second activation layer 423 may be input into the third convolutional layer 431. Also, the first image 25 and a feature map output from the first activation layer 413 may also be input into the third convolutional layer 431. In this case, the feature map output from the second activation layer 423, the first image 25, and the feature map output from the first activation layer 413 may be concatenated and input into the third convolutional layer 431. For example, when the feature map output from the second activation layer 423 has 16 channels, the first image 25 has 16 channels, and the feature map output from the first activation layer 413 has 16 channels, 48 channels may be input into the third convolutional layer 431.

In the third convolutional layer 431, a fifth feature map may be generated through a convolutional operation between the feature map input into the third convolutional layer 431 and a third kernel included in the third convolutional layer 431. In this case, the number of channels of the output fifth feature map may be adjusted by adjusting the number of sub-kernels included in the third kernel. For example, the number of sub-kernels included in the third kernel is set to 16, and a convolutional operation between the third kernel and the feature map (including 48 channels) input into the third convolutional layer 431 is performed so that the fifth feature map including 16 channels may be generated.

The fifth feature map may be input into the third modulation layer 432, and a plurality of weight maps generated by the third weight map generator 463 may be input into the third modulation layer 432. The third weight map generator 463 may generate the plurality of weight maps in the same manner as the first weight map generator 461 described with reference to FIG. 9.

In the third modulation layer 432, a sixth feature map may be generated by applying the plurality of weight maps to the fifth feature map and performing modulation.

In the third modulation layer 432, the sixth feature map may be generated by modulating the fifth feature map in the same manner as the first modulation layer 412 described with reference to FIG. 10.

The sixth feature map may be input into the third activation layer 433, and an activation function operation of applying the activation function to the sixth feature map may be performed in the third activation layer 433.

Also, a feature map output from the third activation layer 433 may be input into a fourth convolutional layer 440. Also, the first image 25, the feature map output from the first activation layer 413, and the feature map output from the second activation layer 423 may also be input into the fourth convolutional layer 440. In this case, the feature map output from the third activation layer 433, the first image 25, the feature map output from the first activation layer 413, and the feature map output from the second activation layer 423 may be concatenated and input into the fourth convolutional layer 440.

For example, when the feature map output from the third activation layer 433 has 16 channels, and each of the first image 25, the feature map output from the first activation layer 413, and the feature map output from the second activation layer 423 has 16 channels, 64 channels may be input into the fourth convolutional layer 440.

In the fourth convolutional layer 440, a seventh feature map may be generated through a convolutional operation between the feature map input into the fourth convolutional layer 440 and a fourth kernel included in the fourth convolutional layer 440. In this case, the number of channels of the output seventh feature map may be adjusted by adjusting the number of sub-kernels included in the fourth kernel. For example, the number of sub-kernels included in the fourth kernel is set to 16, and a convolutional operation between the fourth kernel and the feature map (including 64 channels) input into the fourth convolutional layer 440 is performed so that the seventh feature map including 16 channels may be generated.

Also, the first modulation block 410 may further include a feature scaler 450 that adjusts sizes of values included in the seventh feature map. The feature scaler 450 may perform an operation of multiplying each of the values included in the seventh feature map by a preset constant value, in order to adjust the sizes of the values included in the seventh feature map while maintaining feature information about the seventh feature map.

Also, the first modulation block 410 may include a skip connection 470 that skips a plurality of convolutional layers. The skip connection 470 may be a structure that connects an input (e.g., the first image 25) of the first convolutional layer 411 to an output of the feature scaler 450. For example, because the first modulation block 410 includes the skip connection 470, an output image 40 may be generated by adding the first image 25 to a feature map output as a result of passing the first image 25 through the first to fourth convolutional layers 411, 421, 431, and 440. Accordingly, the first modulation block 410 may refer to a network that has learned a residual between the first image 25 and the output image 40.

Also, the first modulation block 410 may efficiently restore edge information included in the first image 25 with a small number of layers by using channel concatenations and skip connections.

Moreover, although only the first modulation block 410 has been illustrated and described in FIG. 8, other modulation blocks (e.g., second to n-th modulation blocks) included in the image quality processing network 400 may also have the same structure and perform the same or similar operations as those of the first modulation block 410.

Referring back to FIG. 3, according to an embodiment of the disclosure, the second image output from the image quality processing network 400 may be input into the upscale network 500.

Referring to FIG. 4, according to an embodiment of the disclosure, the upscale network 500 may include at least one upscale block and at least one spade block.

Although it has been illustrated in FIG. 4 for convenience of description, that the upscale network 500 includes a first upscale block 510, a first spade block 520, a second upscale block 530, and a second spade block 540, the upscale network 500 may include one upscale block and one spade block or may include at least three upscale blocks and at least three spade blocks.

Also, the first upscale block 510, the first spade block 520, the second upscale block 530, and the second spade block 540 may be sequentially connected, and a convolutional layer 501 and an activation layer 502 may be further positioned after the second spade block 540.

According to an embodiment of the disclosure, the first upscale block 510 may include at least one convolutional layer 511 and at least one activation layer 512. Also, the first upscale block 510 may also include at least one depth-to-space layer 513. For example, as illustrated in FIG. 4, the first upscale block 510 may be configured in a manner in which a convolutional layer 511, a depth-to-space layer 513, and an activation layer 512 are sequentially positioned, so that data output from the convolutional layer 511 is input into the depth-to-space layer 513 and data output from the depth-to-space layer 513 is input into the activation layer 512. However, the disclosure is not limited thereto. In the depth-to-space layer 513, an operation of increasing a resolution of input data and reducing the number of channels as much as the resolution is increased may be performed. The depth-to-space layer 513 may be a layer that changes channel information into resolution information.

According to an embodiment of the disclosure, the first upscale block 510 may generate a first upscaled image by upscaling an image input into the first upscale block 510 by using the convolutional layer 511, the depth-to-space layer 513, and the activation layer 512, which are included in the first upscale block 510.

In this regard, the first upscaled image may be an image obtained by increasing a resolution of the image (the second image) input into the first upscale block 510 by k2 times. In this case, a value of k2 may be a value corresponding to the amount by which the second downscale block 220 downscales the resolution. For example, the value of k2 may be 2, and a resolution of the first upscaled image may be twice a resolution of the second image. However, the disclosure is not limited thereto.

Also, the value of k2 may be variously determined according to the configuration of layers included in the first upscale block 510. For example, the value of k2 may vary according to a kernel of each of the convolutional layers included in the first upscale block 510.

The first upscaled image output from the first upscale block 510 may be input into the first spade block 520.

An operation of the first spade block 520 will be described in detail with reference to FIG. 11.

Figure 11:
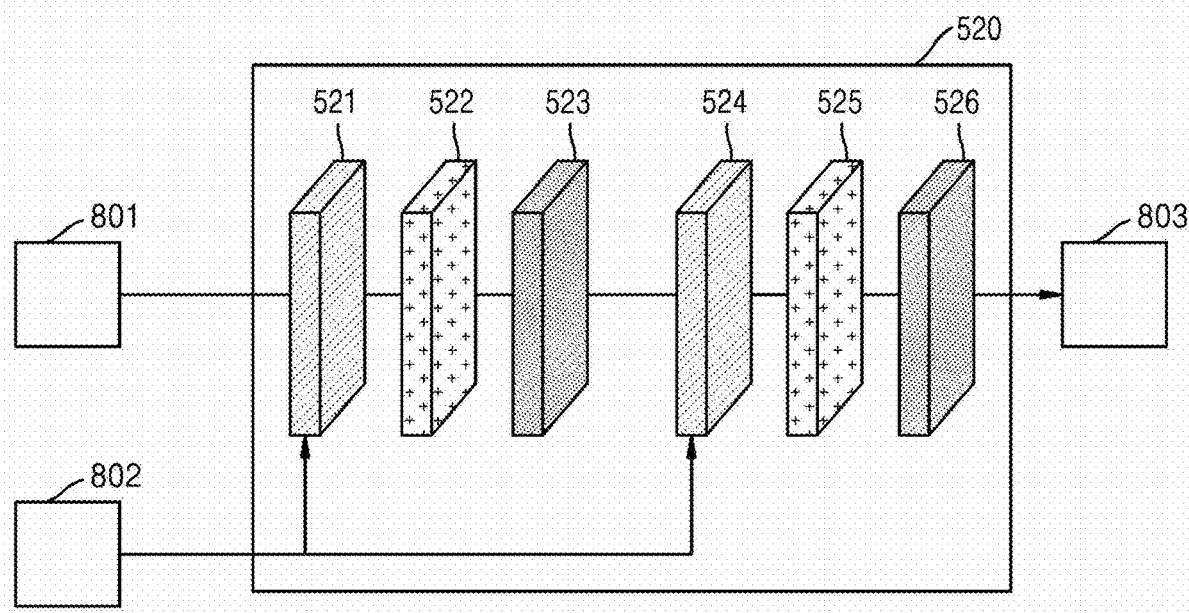
FIG. 11 is a diagram of a structure of a first spade block, according to an embodiment of the disclosure.

FIG. 11 is a diagram of a structure of a first spade block, according to an embodiment of the disclosure.

Referring to FIG. 11, the first spade block 520 may receive a first upscaled image 801 and a first downscaled image 802 input into the second downscale block 220. The first upscaled image 801 input into the first spade block 520 may be an image output from the first upscale block 510 of FIG. 4. Also, the first downscaled image 802 input into the first spade block 520 may be an image output from the first downscale block 210 of FIG. 4. In this case, a resolution of the first upscaled image 801 and a resolution of the first downscaled image 802 may be ½ of a resolution of an input image 20 of FIG. 3. The first spade block 520 may process the first upscaled image 801 based on the first downscaled image 802.

The first spade block 520 may include at least one spade layer and an activation layer consecutively positioned in each spade layer. Also, the first spade block 520 may include a convolutional layer consecutively positioned in the activation layer. For example, a first spade layer 521, a first activation layer 522, and a first convolutional layer 523 may be sequentially positioned, and a second spade layer 524, a second activation layer 525, and a second convolutional layer 526 may be sequentially positioned. Also, an output of the first convolutional layer 523 may be connected to an input of the second spade layer 524. However, the disclosure is not limited thereto.

The first downscaled image 802 may be input into each of the spade layers included in the first spade block 520. For example, the first spade layer 521 and the second spade layer 524 may receive the first downscaled image 802 from the downscale network 200.

According to an embodiment of the disclosure, the first spade layer 521 may process the first upscaled image 801 based on the first downscaled image 802.

An operation in which the first spade layer 521 processes the first upscaled image 801 based on the first downscaled image 802 will be described in detail with reference to FIG. 12.

Figure 12:
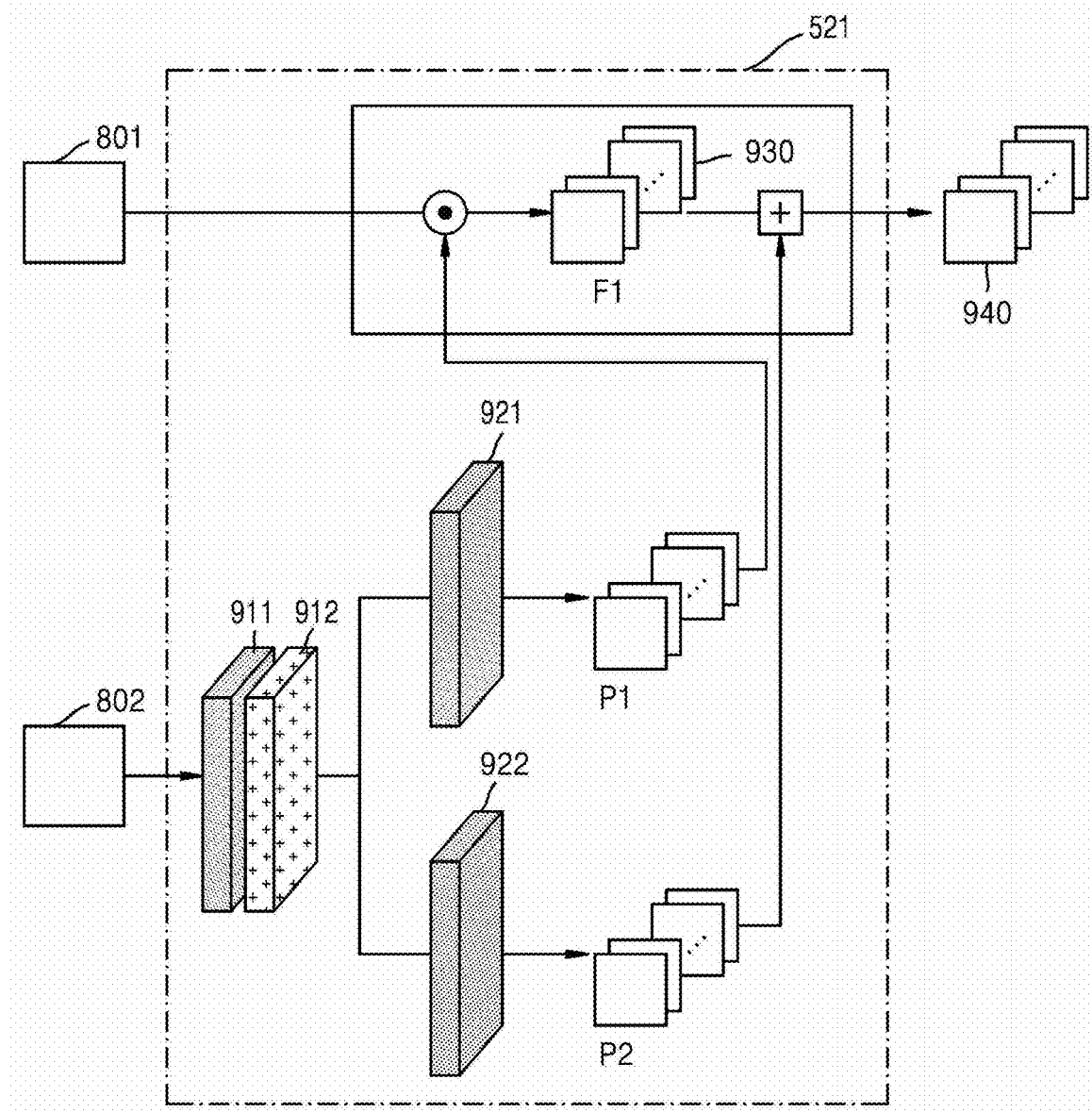
FIG. 12 is a diagram for describing an operation of a first spade layer, according to an embodiment of the disclosure.

FIG. 12 is a diagram for describing an operation of a first spade layer, according to an embodiment of the disclosure.

Referring to FIG. 12, according to an embodiment of the disclosure, the first spade layer 521 may generate a plurality of pieces of parameter information based on the first downscaled image 802. The first spade layer 521 may include a first convolutional layer 911 and an activation layer 912.

The first downscaled image 802 may be input into the first convolutional layer 911, and first feature information may be generated through a convolutional operation in the first convolutional layer 911. The first feature information may be input into the activation layer 912, and an activation function operation of applying the activation function to the first feature information may be performed in the activation layer 912. Second feature information output from the activation layer 912 may be input into each of a plurality of convolutional layers. For example, the second feature information may be input into a second convolutional layer 921, and first parameter information P1 may be generated through a convolutional operation in the second convolutional layer 921. Also, the second feature information may be input into a third convolutional layer 922, and second parameter information P2 may be generated through a convolutional operation in the third convolutional layer 922. However, the disclosure is not limited thereto, and at least three pieces of parameter information may be generated.

In the first spade layer 521, image quality processing may be performed on the first upscaled image 801 by applying a plurality of pieces of parameter information to the first upscaled image 801.

In the first spade layer 521, a third image 940 may be generated by performing various operations based on the first upscaled image 801 and the plurality of pieces of parameter information.

For example, in the first spade layer 521, image quality processing may be performed on the first upscaled image 801 based on the first parameter information P1 and the second parameter information P2. In the first spade layer 521, the third image 940 may be generated by performing a first operation between the first upscaled image 801 and the first parameter information P1 and performing a second operation between a value 930 obtained by performing the first operation and the second parameter information P2.

In this case, the first operation and the second operation may be elementwise multiplication operations or elementwise summation operations.

For example, in the first spade layer 521, an elementwise multiplication operation of the first upscaled image 801 and the first parameter information P1 may be performed, and an elementwise summation operation of the second parameter information P2 and values 930 obtained by performing the elementwise multiplication operation may be performed. Alternatively, the first operation may be an elementwise summation operation and the second operation may be an elementwise multiplication operation, but are not limited thereto. Moreover, the first operation and the second operation may include various operations.

Referring back to FIG. 11, the third image 940 output from the first spade layer 521 may be input into the first activation layer 522, and an activation function operation of applying the activation function to the third image 940 may be performed in the first activation layer 522.

A fourth image output from the first activation layer 522 may be input into the first convolutional layer 523. In the first convolutional layer 523, a fifth image may be generated through a convolutional operation between the fourth image and a kernel included in the first convolutional layer 523.

The fifth image may be input into the second spade layer 524, and a sixth image may be generated in the second spade layer 524 by applying the plurality of pieces of parameter information to the fifth image based on the first downscaled image 802.

The sixth image output from the second spade layer 524 may be input into the second activation layer 525, and an activation function operation of applying the activation function to the sixth image may be performed in the second activation layer 525.

A seventh image output from the second activation layer 525 may be input into the second convolutional layer 526. An eighth image 803 may be generated in the second convolutional layer 526 through a convolutional operation between the seventh image and a kernel included in the second convolutional layer 526.

Referring back to FIG. 4, the eighth image 803 output from the first spade block 520 may be input into the second upscale block 530. The second upscale block 530 may have the same or similar structure and perform the same or similar operations as those of the first upscale block 510.

Accordingly, the second upscale block 530 may generate a second upscaled image by upscaling the eighth image 803. A resolution of the second upscaled image may be twice a resolution of the first upscaled image or the eighth image 803, but is not limited thereto.

According to an embodiment of the disclosure, the second upscaled image may be input into the second spade block 540. Also, the second spade block 540 may receive an image input into the first downscale block 210 of FIG. 4. In this case, a resolution of an image equally input into the first downscale block 210 and the second spade block 540 may be the same as the resolution of the input image 20. Also, the resolution of the second upscaled image output from the second upscale block 530 may also be the same as the resolution of the input image 20. The second spade block 540 may have the same or similar structure and perform the same or similar operations to those of the first spade block 520.

According to an embodiment of the disclosure, the upscale network 500 may further include the first convolutional layer 501, the activation layer 502, and a second convolutional layer 503 after the second spade block 540.

A convolutional operation and an activation operation are performed on a ninth image output from the second spade block 540 in each of the first convolutional layer 501, the activation layer 502, and the second convolutional layer 503, and accordingly, the output image 40 of FIG. 3 may be obtained.

Accordingly, according to an embodiment of the disclosure, the image processing apparatus 100 may obtain the output image 40 in which an image quality of the input image 20 is improved by using the image processing network 50 described with reference to FIGS. 3 to 12.

Also, according to an embodiment of the disclosure, the old photo restoration model, the face restoration model, and the background restoration model may include the image processing network 50 described with reference to FIGS. 3 to 12.

Moreover, according to an embodiment of the disclosure, at least one of the first and second downscale blocks 210 and 220, the first and second feature extraction blocks 310 and 320, the first and second modulation blocks 410 and 420, the first and second upscale blocks 510 and 530, or the first and second spade blocks 520 and 540 may be manufactured in the form of a hardware chip and mounted in the image processing apparatus 100. For example, according to an embodiment of the disclosure, at least one of downscale blocks, feature extraction blocks, upscale blocks, or spade blocks may be manufactured in the form of a dedicated hardware chip for artificial intelligence (AI), or may be manufactured as a part of an existing general-purpose processor (e.g., a central processing unit (CPU) or an application processor) or a dedicated graphics processor (e.g., a graphics processing unit (GPU)) and mounted on the image processing apparatus 100.

Also, at least one of the downscale blocks, the feature extraction blocks, the modulation blocks, the upscale blocks, or the spade blocks may be implemented as a software module. When at least one of the downscale blocks, the feature extraction blocks, the modulation blocks, the upscale blocks, or the spade blocks is implemented as a software module (or a program module including instructions), the software module may be stored in a non-transitory computer-readable medium. Also, in this case, at least one software module may be provided by an operating system (OS) or a certain application. Alternatively, a part of at least one software module may be provided by an OS, and the remaining part may be provided by a certain application.

The structure of the image processing network 50 illustrated and described with reference to FIGS. 3 to 12 is provided for illustration of example embodiments of the disclosure. Each component of the image processing network 50 may be integrated, added, or omitted according to the specifications of the image processing apparatus 100 that is actually implemented. For example, two or more components may be combined into one component, or one component may be subdivided into two or more components as needed. In addition, the function performed in each block is for describing the embodiments of the disclosure, and the specific operation or apparatus does not limit the spirit and scope of the disclosure.

Figure 13:
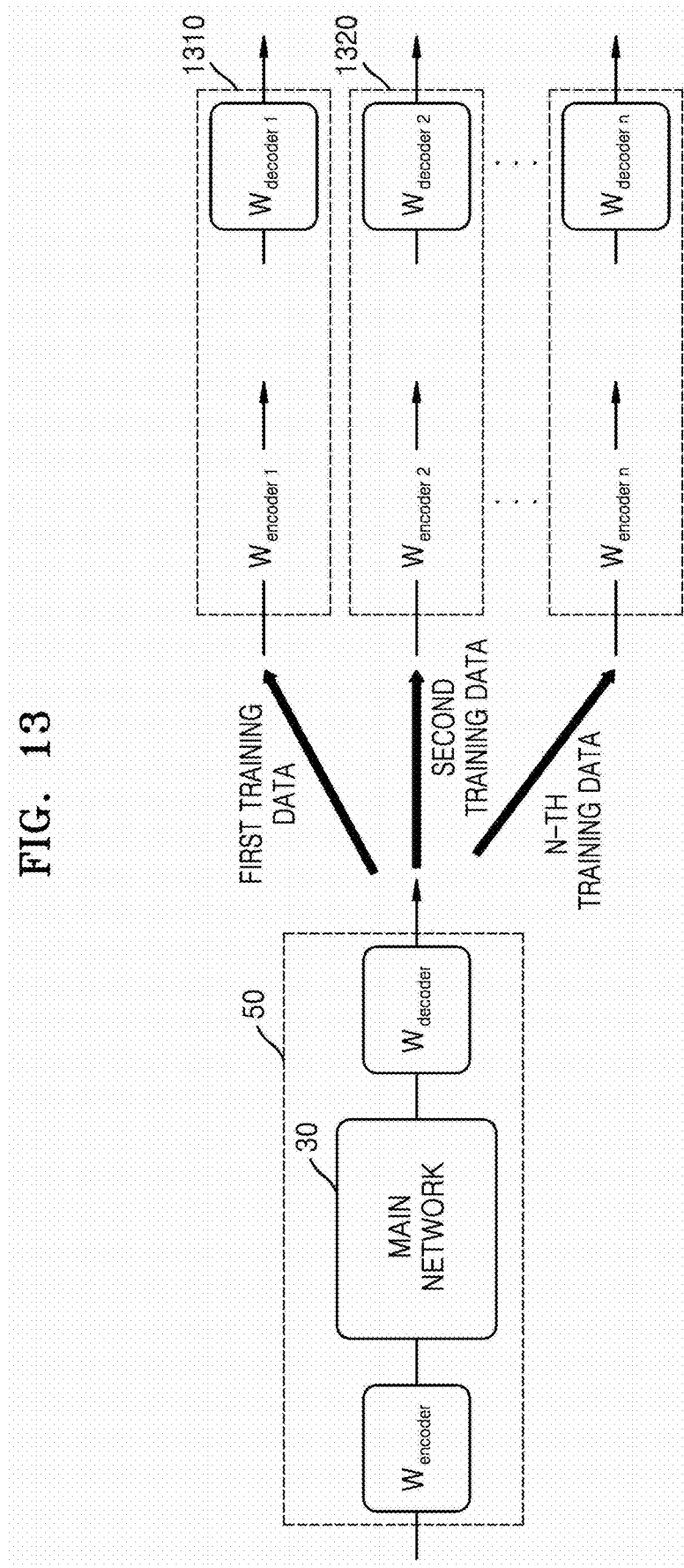
FIG. 13 is a diagram for describing an operation of determining weights of a downscale network and an upscale network included in a face restoration model, according to an embodiment of the disclosure.

FIG. 13 is a diagram for describing an operation of determining weights of a downscale network and an upscale network included in a face restoration model, according to an embodiment of the disclosure.

According to an embodiment of the disclosure, the face restoration model may include the image processing network 50 described with reference to FIGS. 3 to 12 and may determine weight information ($W_{encoder}$, $W_{decoder}$) about a downscale network and an upscale network included in the image processing network 50, according to a size or a degree of deterioration of a face region included in an input image.

For example, the image processing apparatus 100 according to an embodiment may receive, from an external device, a plurality of pieces of weight information ($W_{encoder}$, $W_{decoder}$) corresponding to the downscale network and the upscale network. The image processing apparatus 100 may store the plurality of pieces of received weight information ($W_{encoder}$, $W_{decoder}$) and may determine, from among the plurality of pieces of stored weight information ($W_{encoder}$, $W_{decoder}$), weight information ($W_{encoder}$, $W_{decoder}$) about the downscale network and the upscale network included in the image processing network 50, according to the size or the degree of deterioration of the face region included in the input image.

The external device may determine a plurality of pieces of weight information corresponding to the downscale network and the upscale network, by training the image processing network 50 (e.g., the face restoration model) by using training data sets including face images having a preset size. In this case, weights of the main network 30 included in the image processing network 50 may be fixed to preset values.

For example, the external device may obtain first weight information 1310 ($W_{encoder1}$, $W_{decoder1}$) about the downscale network and the upscale network corresponding to a first size, by training the image processing network 50 by using first training data sets including face images having the first size. Also, the external device may obtain second weight information 1320 ($W_{encoder2}$, $W_{decoder2}$) about the downscale network and the upscale network corresponding to a second size, by training the image processing network 50 by using second training data sets including face images having the second size.

In addition, the external device may determine the plurality of pieces of weight information corresponding to the downscale network and the upscale network, by training the face restoration model by using training data sets including face images having a preset degree of deterioration. In this case, weights of a main network included in the face restoration model may be fixed to preset values.

For example, the external device may obtain third weight information about the downscale network and the upscale network corresponding to a first degree of deterioration, by training the face restoration model by using training data sets including face images having the first degree of deterioration. Also, the external device may obtain fourth weight information about the downscale network and the upscale network corresponding to a second degree of deterioration, by training the face restoration model by using training data sets including face images having the second degree of deterioration.

Accordingly, the external device may obtain n pieces of weight information W1, W2, ..., Wn corresponding to the downscale network and the upscale network according to a size of a face image or a degree of deterioration of the face image, and according to an embodiment of the disclosure, an electronic device may receive the n pieces of weight information W1, W2, ..., Wn from the external device.

According to an embodiment of the disclosure, a face region restorer (e.g., the first face region restorer 123 or the second face region restorer 132) may determine a weight of the downscale network and the upscale network of the image processing network 50 included in the face restoration model, based on the plurality of pieces of weight information, the size of the face region included in the input image, and the degree of deterioration of the face region.

For example, a weight W of the downscale network and the upscale network may be determined by using the following equation.

$$W = F(W1, W2, \ldots, Wn) = \sum_{i=1}^{n} ai \times Wi \quad \text{[Equation 4]}$$

In Equation 4, W denotes the weight of the downscale network and the upscale network included in the face restoration model, and ai denotes a coefficient corresponding to each of the plurality of pieces of weight information determined based on the size and degree of deterioration of the face region included in the input image. A method of determining the coefficient corresponding to each of the plurality of pieces of weight information will be described in detail with reference to FIG. 14.

Figure 14:
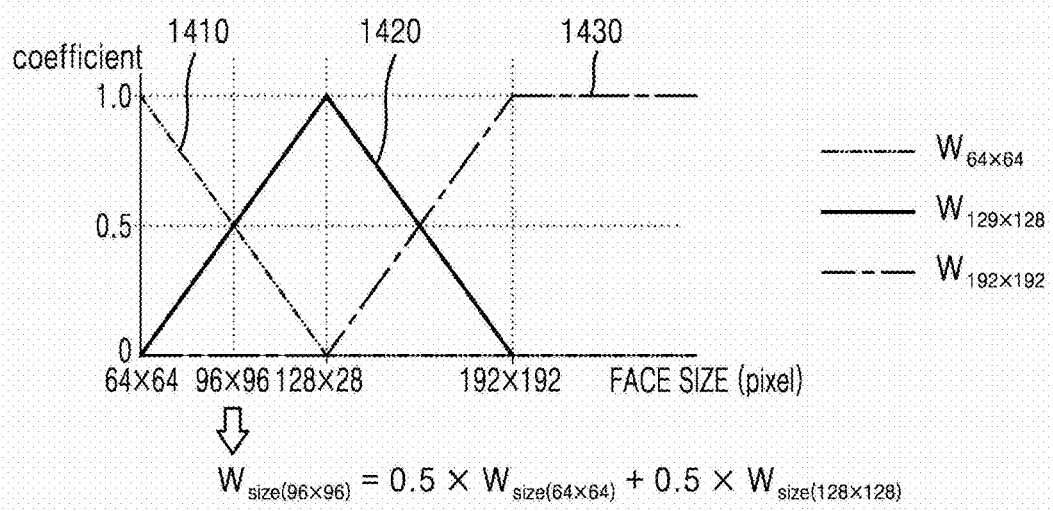
FIG. 14 is a diagram of coefficient information corresponding to a plurality of pieces of weight information about a downscale network and an upscale network, according to an embodiment of the disclosure.

FIG. 14 is a diagram of coefficient information corresponding to a plurality of pieces of weight information about a downscale network and an upscale network, according to an embodiment of the disclosure.

Referring to FIG. 14, according to an embodiment of the disclosure, the image processing network included in the face restoration model may be trained by using face images having a first size (e.g., 64×64) as training data, wherein a weight of the downscale network and the upscale network may be determined as a first weight ($W_{size(64\times64)}$). Also, the image processing network may be trained by using face images having a second size (e.g., 128×128) as training data, wherein a weight of the downscale network and the upscale network may be determined as a second weight ($W_{size(128\times128)}$). In addition, the image processing network may be trained by using face images having a third size (e.g., 192×192) as training data, wherein a weight of the downscale network and the upscale network may be determined as a third weight ($W_{size(192\times192)}$).

Also, coefficient information corresponding to the first weight, the second weight, and the third weight according to the size of the face region may be shown as a first graph 1410, a second graph 1420, and a third graph 1430.

According to an embodiment of the disclosure, when the face region included in the input image has a fourth size (e.g., 96×96), a face restorer (e.g., the first face region restorer 123 or the second face region restorer 132) may calculate a fourth weight ($W_{size(96\times96)}$) corresponding to the fourth size based on coefficient information about the first weight, the second weight, and the third weight, corresponding to the fourth size, the first weight, the second weight, and the third weight. For example, the fourth weight ($W_{size(96\times96)}$) may be determined as $0.5 \times W_{size(64\times64)} + 0.5 \times W_{size(128\times128)} + 0 \times W_{size(192\times192)}$, as illustrated in FIG. 14.

Also, according to an embodiment of the disclosure, the image processing network included in the face restoration model is trained by using face images having a preset degree of deterioration as training data, and accordingly, a plurality of pieces of weight information about the downscale network and the upscale network according to a degree of deterioration may be determined.

According to an embodiment of the disclosure, the face restorer may calculate a weight according to the degree of deterioration of the face region, in the same manner as the method of calculating the weight according to the size of the face region. Also, the face restorer may obtain a final weight based on a weight ($W_{size}$) according to the size of the face region and a weight ($W_{blur}$) according to the degree of deterioration. The final weight of the downscale network and the upscale network according to the size and degree of deterioration of the face region may be expressed by Equation 5 below.

$$W = a \times W_{size} + (1-a) \times W_{blur} \quad \text{[Equation 5]}$$

In Equation 5, an addition coefficient a may be determined by visual information fidelity (VIF) of the face region, but is not limited thereto. The addition coefficient a may have a value of 0 or more and 1 or less, and may have a value close to 1 as the degree of deterioration of the face region decreases.

FIG. 15 is a flowchart of an operating method of an image processing apparatus, according to an embodiment of the disclosure, FIG. 16 is a flowchart of operations included in operation 1510 (S1510) of FIG. 15, and FIG. 17 is a flowchart of operations included in operation 1540 (S1540) of FIG. 15.

Referring to FIG. 15, according to an embodiment of the disclosure, the image processing apparatus 100 may obtain a first image by downscaling an input image by using a downscale network (S1510). Operation 1510 (S1510) will be described in detail with reference to FIG. 16.

FIG. 16 is a flowchart of operations included in operation 1510 (S1510) of FIG. 15.

According to an embodiment of the disclosure, the downscale network may include at least one downscale block. For example, the downscale network may include a first downscale block and a second downscale block, but is not limited thereto.

Referring to FIG. 16, according to an embodiment of the disclosure, the image processing apparatus 100 may obtain a first downscaled image by downscaling the input image by using the first downscale block (S1610).

For example, the image processing apparatus 100 may generate the first downscaled image obtained by downscaling the input image, by passing the input image through a convolutional layer, a space-to-depth layer, and an activation layer, which are included in the first downscale block. In this case, the first downscaled image may be an image obtained by reducing a resolution of the input image to 1/k1.

The first downscaled image output from the first downscale block may be input into the second downscale block.

According to an embodiment of the disclosure, the image processing apparatus 100 may obtain a second downscaled image by downscaling the first downscaled image by using the second downscale block (S1620).

For example, the second downscale block may have the same or similar structure to that of the first downscale block, and the second downscaled image may be an image obtained by reducing a resolution of the first downscaled image to 1/k2.

The image processing apparatus 100 may obtain a first image based on the second downscaled image (S1630) and input the first image to an image quality processing network and a feature extraction network.

Referring back to FIG. 15, according to an embodiment of the disclosure, the image processing apparatus 100 may extract first feature information corresponding to the first image by using the feature extraction network (S1520).

For example, the feature extraction network may include at least one feature extraction block, and a feature extraction block may include a plurality of convolutional layers and an activation layer consecutively positioned in each of the plurality of convolutional layers. Also, the feature extraction block may include a skip connection that skips at least one convolutional layer. Also, the feature extraction block may further include a normalization layer and a residual scaler.

The image processing apparatus 100 may extract feature information by performing a convolutional operation, an activation operation, and normalization on the first image. Because this has been described in detail with reference to FIG. 6, the same description will not be provided herein.

Also, according to an embodiment of the disclosure, the extracted feature information may include at least one of edge information, shadow region information, luminance information, transform noise information, or texture information about the first image.

According to an embodiment of the disclosure, the image processing apparatus 100 may obtain a second image, by performing image processing on the first image by using the image quality processing network.

According to an embodiment of the disclosure, the image quality processing network may include a plurality of modulation blocks, and a modulation block may include a plurality of convolutional layers and a modulation layer consecutively positioned in each of the plurality of convolutional layers. Also, according to an embodiment of the disclosure, the modulation block may include an activation layer consecutively positioned in the modulation layer. In addition, according to an embodiment of the disclosure, the modulation block may include a weight map generator corresponding to the modulation layer. Because the structure of the modulation block has been described in detail with reference to FIG. 8, a detailed description thereof will not be provided herein.

The image processing apparatus 100 may generate a second feature map by applying a plurality of weight maps generated by the weight map generator to a first feature map obtained from the convolutional layer included in the modulation block. Also, the image processing apparatus 100 may generate the second image based on the second feature map. Because this has been described in detail with reference to FIGS. 8 to 10, a detailed description thereof will not be provided herein.

According to an embodiment of the disclosure, the image processing apparatus 100 may obtain an output image by upscaling the second image and performing image quality processing on the upscaled second image, by using the upscale network (S1540). Operation 1540 (S1540) will be described in detail with reference to FIG. 17.

FIG. 17 is a flowchart of operations included in operation 1540 (S1540) of FIG. 15.

According to an embodiment of the disclosure, the upscale network may include at least one upscale block and at least one spade block. For example, the upscale network may include a first upscale block, a first spade block, a second upscale block, and a second spade block, but is not limited thereto.

Referring to FIG. 17, according to an embodiment of the disclosure, the image processing apparatus 100 may obtain a first upscaled image by upscaling the second image by using the first upscale block (S1710).

For example, the image processing apparatus 100 may obtain the first upscaled image upscaled by passing the second image through a convolutional layer, a depth-to-space layer, and an activation layer, which are included in the first upscale block. In this case, the first upscaled image may be an image obtained by increasing a resolution of the second image by k2 times.

The first upscaled image output from the first upscale block may be input into the first spade block.

According to an embodiment of the disclosure, the image processing apparatus 100 may obtain a third image by extracting first feature information corresponding to the first downscaled image and performing image quality processing on the first upscaled image based on the extracted first feature information, by using the first spade block (S1720).

According to an embodiment of the disclosure, the first spade block may include at least one spade layer and an activation layer consecutively positioned in each spade layer. Also, the first spade block may include a convolutional layer consecutively positioned in the activation layer. According to an embodiment of the disclosure, the image processing apparatus 100 may generate a plurality of pieces of parameter information in the spade layer based on the first downscaled image, and may obtain the third image by performing image quality processing on the first upscaled image based on the plurality of pieces of parameter information. Because this has been described in detail with reference to FIG. 12, a detailed description thereof will not be provided herein.

According to an embodiment of the disclosure, the image processing apparatus 100 may obtain a second upscaled image obtained by upscaling the third image by using the second upscale block (S1730).

For example, the second upscale block may have the same or similar structure to that of the first upscale block, and the second upscaled image may be an image obtained by increasing a resolution of the first upscaled image by k1 times.

The second upscaled image output from the second upscale block may be input into the second spade block.

According to an embodiment of the disclosure, the image processing apparatus 100 may obtain an output image by extracting second feature information corresponding to the input image and performing image quality processing on the second upscaled image based on the extracted second feature information, by using the second spade block (S1740). For example, the second spade block may have the same or similar structure to that of the first spade block and may perform image quality processing on the second upscaled image by performing the same or similar operations to those of the first spade block. Also, the image processing apparatus 100 may obtain the output image based on the second upscaled image on which image quality processing has been performed.

FIG. 18 is a block diagram of a configuration of an image processing apparatus, according to an embodiment of the disclosure.

Referring to FIG. 18, according to an embodiment of the disclosure, the image processing apparatus 100 may include a processor 140 and a memory 150.

According to an embodiment of the disclosure, the processor 140 may control the image processing apparatus 100 overall. According to an embodiment of the disclosure, the processor 140 may execute at least one program stored in the memory 150.

According to an embodiment of the disclosure, the memory 150 may store various data, programs, or applications for driving and controlling the image processing apparatus 100. A program stored in the memory 150 may include one or more instructions. The program (one or more instructions) or an application stored in the memory 150 may be executed by the processor 140.

According to an embodiment of the disclosure, the processor 140 may include at least one of a central processing unit (CPU), a graphic processing unit (GPU), or a video processing unit (VPU). Alternatively, according to an embodiment of the disclosure, the processor 140 may be implemented in the form of a system on chip (SoC) in which at least one of a CPU, a GPU, or a VPU is integrated. Alternatively, the processor 140 may further include a neural processing unit (NPU).

According to an embodiment of the disclosure, the processor 140 may detect whether an input image is an old photo by using the classification network 115 of FIG. 2.

Also, the processor 140 may perform image quality processing on the input image by using the image processing network 50 illustrated and described with reference to FIGS. 3 to 12. For example, the processor 140 may remove compression artifacts included in the input image by using the image processing network 50. Also, the processor 140 may perform a process of removing noise while maintaining detailed texture information and structural information such as edges of the input image.

Moreover, according to an embodiment of the disclosure, the image processing network 50 may be a network trained by a server or an external device. The external device may obtain weight information by training the image processing network 50 based on training data.

According to an embodiment of the disclosure, the processor 140 may receive the image processing network 50, which has been trained, from the server or the external device, and store the image processing network 50 in the memory 150. For example, according to an embodiment of the disclosure, the memory 150 may store structure and parameter values (weight information) of the image processing network 50, and according to an embodiment of the disclosure, the processor 140 may generate an output image, in which edge characteristics or texture characteristics are maintained while noise is removed from the input image, by using the parameter values stored in the memory 150.

Also, according to an embodiment of the disclosure, weight information corresponding to a downscale network and an upscale network included in the image processing network 50 may include a plurality of pieces of weight information according to a size or a degree of deterioration of a face image. The external device may determine a plurality of pieces of weight information corresponding to the downscale network and the upscale network, by training the image processing network 50 included in the face restoration model by using training data sets including face images having a preset size. In this case, weights of the main network 30 included in the image processing network 50 may be fixed to preset values.

Also, the external device may determine a plurality of pieces of weight information corresponding to the downscale network and the upscale network, by training the image processing network 50 included in the face restoration model by using training data sets including face images having a preset degree of deterioration. In this case, weights of the main network 30 included in the image processing network 50 may be fixed to preset values.

According to an embodiment of the disclosure, the processor 140 may determine the weights of the downscale network and the upscale network of the image processing network 50 included in the face restoration model, based on the plurality of pieces of weight information, a size of a face region included in the input image, and a degree of deterioration of the face region.

FIG. 19 is a block diagram of a configuration of an image processing apparatus, according to another embodiment of the disclosure. An image processing apparatus 1900 of FIG. 19 may be another embodiment of the disclosure of the image processing apparatus 100 described with reference to FIG. 1.

Referring to FIG. 19, according to an embodiment of the disclosure, the image processing apparatus 1900 may include a sensing unit 1910, a communicator (or communication interface) 1920, a processor 1930, an audio/video (NV) input unit 1940, an output unit (or an output interface) 1950, a memory 1960, and a user input unit (or an user input interface) 1970.

The processor 1930 of FIG. 19 may correspond to the processor 140 of FIG. 18 and the memory 1960 of FIG. 19 may correspond to the memory 150 of FIG. 18, and thus, the same description will not be provided herein.

The sensing unit 1910 may include a sensor that detects a state of the image processing apparatus 1900 or a state around the image processing apparatus 1900. Also, the sensing unit 1910 may transmit information detected by the sensor to the processor 1930.

The communicator 1920 may include a short-range wireless communicator, a mobile communicator, etc. in response to the performance and structure of the image processing apparatus 1900, but is not limited thereto.

The short-range wireless communicator may include a Bluetooth low energy (BLE) communicator, a near-field communicator, a wireless local area network (WLAN) (Wi-Fi) communicator, a Zigbee communicator, an infrared data association (IrDA) communicator, a Wi-Fi direct (WFD) communicator, an ultra-wideband (UWB) communicator, an Ant+ communicator, a microwave (uWave) communicator, etc., but is not limited thereto.

The mobile communicator may transceive wireless signals with at least one of a base station, an external terminal, or a server, through a mobile communication network. Here, the wireless signals may include a sound call signal, a video call signal, or various types of data according to transceiving of text/multimedia messages.

According to an embodiment of the disclosure, the communicator 1920 may receive a compressed image from an external device or transmit the compressed image.

According to an embodiment of the disclosure, the processor 1930 may include a single core, a dual core, a triple core, a quad core, and multiple cores thereof. Also, the processor 1930 may include a plurality of processors.

According to an embodiment of the disclosure, the memory 1960 may include at least one type of storage medium from among a flash memory-type storage medium, a hard disk-type storage medium, a multimedia card micro-type storage medium, a card-type memory (for example, a secure digital (SD) or extreme digital (XD) memory), a random access memory (RAM), a static RAM (SRAM), a read-only memory (ROM), an electrically erasable-programmable ROM (EEPROM), a programmable ROM (PROM), a magnetic memory, a magnetic disk, and an optical disk.

The NV input unit 1940 is a component for inputting an audio signal or a video signal and may include a camera 1941 and a microphone 1942. The camera 1941 may obtain an image frame such as a still or moving image via an image sensor in a video call mode or capture mode. An image captured via the image sensor may be processed by the processor 1930 or a separate image processor (not illustrated).

The image frame processed by the camera 1941 may be stored in the memory 1960 or transmitted to the outside through the communicator 1920. The camera 1941 may include two or more cameras according to the configuration of the image processing apparatus 1900.

The microphone 1942 may receive an external sound signal and process the sound signal into electrical speech data. For example, the microphone 1942 may receive the sound signal from an external device or a speaker. The microphone 1942 may use various noise removal algorithms for removing noise occurring when the external sound signal is input.

The output unit 1950 is a component for outputting an audio signal, a video signal, or a vibration signal and may include a display 1951, a sound output unit 1952, a vibration unit 1953, etc.

According to an embodiment of the disclosure, the display 1951 may display an image on which image quality processing has been performed by using the image processing network 50.

The sound output unit 1952 may output audio data received from the communicator 1920 or stored in the memory 1960. Furthermore, the sound output unit 1952 may also output sound signals (e.g., a call signal reception sound, a message reception sound, and a notification sound) associated with functions performed by the image processing apparatus 1900. The sound output unit 1952 may include a speaker, a buzzer, etc.

The vibration unit 1953 may output a vibration signal. For example, the vibration unit 1953 may output a vibration signal corresponding to an output of video data or audio data (e.g., a call signal reception sound, a message reception sound, etc.). Also, the vibration unit 1953 may output a vibration signal when a touch is input on a touch screen.

The user input unit 1970 is a device via which a user inputs data necessary for controlling the image processing apparatus 1900. For example, the user input unit 1970 may include a key pad, a dome switch, a touch pad (a touch capacitance method, a pressure-resistive layer method, an infrared sensing method, a surface ultrasonic conductive method, an integral tension measurement method, a piezo effect method, etc.), a jog wheel, a jog switch, etc., but is not limited thereto.

Moreover, the block diagrams of the image processing apparatuses 100 and 19300 of FIGS. 18 and 19 may be provided for illustration of embodiments of the disclosure. Each component of the block diagram may be integrated, added, or omitted according to the specifications of the image processing apparatus 100 that is actually implemented. That is, two or more components may be combined into one component, or one component may be subdivided into two or more components as needed. In addition, the function performed in each block is for describing the embodiments of the disclosure, and the specific operation or apparatus does not limit the spirit and scope of the disclosure.

According to the embodiments of the disclosure, the operating method of the image processing apparatus may be embodied as program commands executable by various computer means and may be recorded on a computer-readable recording medium. The computer-readable recording medium may include program commands, data files, data structures, and the like separately or in combinations. The program commands recorded on the computer-readable recording medium may be specially designed and configured for the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device such as a ROM, a RAM, or a flash memory which is specially configured to store and execute program commands. Examples of the program commands include high-level language codes that may be executed by a computer by using an interpreter or the like as well as machine codes that are generated by a compiler.

Also, the image processing apparatus and the operating method of the image processing apparatus according to the disclosed embodiments may be included in a computer program product and provided in that form. The computer program product is a product purchasable between a seller and a purchaser.

The computer program product may include an S/W program, and a computer-readable storage medium in which the S/W program is stored. For example, the computer program product may include an S/W program form of product (e.g., a downloadable application) electronically distributed through a manufacturing company of the electronic device or an electronic market (e.g., Google PlayStore™, or App Storer™). For electronic distribution, at least a portion of the SAN program may be stored in a storage medium or temporarily generated. In this case, the storage medium may be a storage medium of a server in the manufacturer or the electronic market or a relay server that temporarily stores the SAN program.

The computer program product may include a storage medium of a server or a storage medium of a client device in a system including the server and the client device. When there is a third device (e.g., a smartphone) communicating with the server or the client device, the computer program product may include a storage medium of the third device. Alternatively or additionally, the computer program product may include an SAN program transmitted from the server to the client device or the third device or from the third device to the client device.

In this case, one of the server, the client device, and the third device may execute a method according to disclosed embodiments of the disclosure by executing the computer program product. Alternatively, at least two of the server, the client device, and the third device may execute a method according to disclosed embodiments of the disclosure in a distributed fashion by executing the computer program product.

For example, the server (e.g., a cloud server or an artificial intelligence server) may execute the computer program product stored in the server, and may control the client device communicating with the server to perform a method according to disclosed embodiments of the disclosure.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Although the embodiments of the disclosure have been described in detail above, the scope of the disclosure is not limited thereto, and various modifications and improvements made by one of ordinary skill in the art by using the basic concept of the disclosure defined by the claims are also within the scope of the disclosure.

The invention claimed is:

1. An image processing apparatus for performing image quality processing on an image, the image processing apparatus comprising:
a memory configured to store one or more instructions; and
a processor configured to execute the one or more instructions stored in the memory to:
obtain a first image by downscaling an input image, by using a downscale network comprising at least one downscale block;
extract first feature information corresponding to the first image, by using a feature extraction network comprising at least one feature extraction block;
obtain a second image by performing image quality processing on the first image based on the first feature information, by using an image quality processing network comprising at least one modulation block; and
obtain an output image by upscaling the second image and performing image quality processing on the upscaled second image, by using an upscale network, the upscale network comprising at least one upscale block and at least one spade block,
wherein the processor is further configured to execute the one or more instructions to:
by using the at least one spade block, extract second feature information corresponding to the input image and perform image quality processing on the upscaled second image based on the second feature information.

2. The image processing apparatus of claim 1, wherein the downscale network comprises a first downscale block and a second downscale block, and
wherein the processor is further configured to execute the one or more instructions to:
obtain a first downscaled image by downscaling the input image by using the first downscale block;
obtain a second downscaled image by downscaling the first downscaled image by using the second downscale block, the first downscaled image being received from the first downscale block; and
obtain the first image based on the second downscaled image.

3. The image processing apparatus of claim 2, wherein the upscale network comprises a first upscale block, a first spade block, a second upscale block, and a second spade block, and
wherein the processor is further configured to execute the one or more instructions to:
obtain a first upscaled image by upscaling the second image by using the first upscale block;
obtain a third image by extracting third feature information corresponding to the first downscaled image and performing image quality processing on the first upscaled image based on the third feature information, by using the first spade block;
obtain a second upscaled image by upscaling the third image by using the second upscale block; and
obtain the output image by extracting the second feature information corresponding to the input image and performing image quality processing on the second upscaled image based on the second feature information, by using the second spade block.

4. The image processing apparatus of claim 3, wherein a resolution of the first upscaled image is equal to a resolution of the first downscaled image, and a resolution of the second upscaled image is equal to a resolution of the input image.

5. The image processing apparatus of claim 3, wherein the processor is further configured to execute the one or more instructions to, by using the first spade block, extract the third feature information, the third feature information comprising a first feature map and a second feature map; perform a first operation between the first upscaled image and the first feature map; and perform a second operation between a value obtained by performing the first operation and the second feature map.

6. The image processing apparatus of claim 5, wherein the first operation is a multiplication operation, and the second operation is a summation operation.

7. The image processing apparatus of claim 1, wherein the first feature information extracted from the feature extraction network comprises at least one of edge information, shadow region information, luminance information, transform noise information, or texture information about the first image.

8. The image processing apparatus of claim 1, wherein the at least one modulation block comprises a convolutional layer, a modulation layer, and a weight map generator, the modulation layer being configured to receive a first feature map output from the convolutional layer,
wherein the weight map generator is configured to generate at least one weight map based on the first feature information, and
wherein the processor is further configured to execute the one or more instructions to, in the modulation layer, generate a second feature map by applying the at least one weight map to the first feature map.

9. The image processing apparatus of claim 8, wherein the at least one weight map comprises a first weight map and a second weight map, and
the processor is further configured to execute the one or more instructions to, in the modulation layer, generate the second feature map by performing a first operation between the first feature map and the first weight map and performing a second operation between a value obtained by performing the first operation and the second weight map.

10. The image processing apparatus of claim 9, wherein the at least one modulation block comprises a plurality of convolutional layers and a skip connection, the skip connection being configured to skip at least one of the plurality of convolutional layers.

11. A method of operating an image processing apparatus, the method comprising:
obtaining, by using a downscale network comprising at least one downscale block, a first image by downscaling an input image;
extracting, by using a feature extraction network comprising at least one feature extraction block, first feature information corresponding to the first image;
obtaining, by using an image quality processing network comprising at least one modulation block, a second image by performing image quality processing on the first image based on the first feature information; and
obtaining, by using an upscale network, an output image by upscaling the second image and performing image quality processing on the upscaled second image, the upscale network comprising at least one upscale block and at least one spade block,
wherein the obtaining of the output image by upscaling the second image and performing image quality processing on the upscaled second image comprises, by using the at least one spade block, extracting second feature information corresponding to the input image and performing image quality processing on the upscaled second image based on the second feature information.

12. The method of claim 11, wherein the downscale network comprises a first downscale block and a second downscale block, and
wherein the obtaining of the first image by downscaling the input image comprises:
obtaining a first downscaled image by downscaling the input image by using the first downscale block;
obtaining a second downscaled image by downscaling the first downscaled image by using the second downscale block, the first downscaled image being received from the first downscale block; and
obtaining the first image based on the second downscaled image.

13. The method of claim 12, wherein the upscale network comprises a first upscale block, a first spade block, a second upscale block, and a second spade block, and
wherein the obtaining of the output image by upscaling the second image and performing image quality processing on the upscaled second image comprises:
obtaining, by using the first upscale block, a first upscaled image by upscaling the second image;
obtaining, by using the first spade block, a third image by extracting third feature information corresponding to the first downscaled image and performing image quality processing on the first upscaled image based on the third feature information;
obtaining, by using the second upscale block, a second upscaled image by upscaling the third image;
extracting, by using the second spade block, the second feature information corresponding to the input image; and
obtaining the output image by performing image quality processing on the second upscaled image based on the second feature information.

14. The method of claim 13, wherein a resolution of the first upscaled image is equal to a resolution of the first downscaled image, and a resolution of the second upscaled image is equal to a resolution of the input image.

15. A non-transitory computer-readable recording medium having stored therein a program for performing the method of claim 11.

* * * * *